(12) United States Patent
Ahn et al.

(10) Patent No.: US 10,148,997 B2
(45) Date of Patent: Dec. 4, 2018

(54) MOBILE TERMINAL AND METHOD FOR CONTROLLING THE SAME

(71) Applicant: LG ELECTRONICS INC., Seoul (KR)

(72) Inventors: Sooyoung Ahn, Seoul (KR); Myoungho Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 15/013,302

(22) Filed: Feb. 2, 2016

(65) Prior Publication Data

US 2017/0070766 A1 Mar. 9, 2017

(30) Foreign Application Priority Data

Sep. 9, 2015 (KR) ........................ 10-2015-0127834

(51) Int. Cl.
| | |
|---|---|
| H04N 21/422 | (2011.01) |
| G06F 3/0488 | (2013.01) |
| G06F 3/0482 | (2013.01) |
| G06F 3/0484 | (2013.01) |
| H04N 21/482 | (2011.01) |
| G06F 3/0486 | (2013.01) |
| H04N 21/45 | (2011.01) |

(52) U.S. Cl.
CPC ..... *H04N 21/42209* (2013.01); *G06F 3/0482* (2013.01); *G06F 3/0486* (2013.01); *G06F 3/04842* (2013.01); *G06F 3/04883* (2013.01); *G06F 3/04886* (2013.01); *H04N 21/42224* (2013.01); *H04N 21/4532* (2013.01); *H04N 21/4821* (2013.01)

(58) Field of Classification Search
CPC ................................................ H04N 21/42209
See application file for complete search history.

(56) References Cited

U.S. PATENT DOCUMENTS 8,966,546 B2 * 2/2015 Seo ..................... H04N 5/44543
725/80
2010/0175089 A1 7/2010 Seo et al.
(Continued)

FOREIGN PATENT DOCUMENTS

EP 2477127 A1 7/2012

*Primary Examiner* — Nasser Goodarzi
*Assistant Examiner* — Adil Ocak
(74) *Attorney, Agent, or Firm* — Dentons US LLP

(57) ABSTRACT

A mobile terminal and a method for controlling the same that may perform wireless communication with a video output device are disclosed. The mobile terminal comprises a wireless communication unit configured to perform wireless communication with a video output device; a touch screen; and a controller controlling the touch screen to output at least one folder to a first area of the touch screen and output an electronic program guide (EPG), which includes channel information related to the video output device, to a second area different from the first area, wherein the controller, if a predetermined touch is applied to any one of the at least one folder output to the first area, generates a virtual channel configured to output videos included in the any one folder from the video output device, and changes the EPG such that channel information corresponding to the generated virtual channel is reflected in the EPG.

19 Claims, 21 Drawing Sheets

(56) References Cited

U.S. PATENT DOCUMENTS

| | | | |
|---|---|---|---|
| 2010/0257561 A1* | 10/2010 | Maissel | H04N 5/44543 |
| | | | 725/41 |
| 2011/0267291 A1* | 11/2011 | Choi | G06F 3/0346 |
| | | | 345/173 |
| 2012/0057853 A1 | 3/2012 | Huber et al. | |
| 2013/0136412 A1* | 5/2013 | Lee | H04M 3/4878 |
| | | | 386/230 |
| 2013/0254692 A1 | 9/2013 | Han | |
| 2015/0237389 A1* | 8/2015 | Grouf | H04N 21/26283 |
| | | | 725/49 |

* cited by examiner

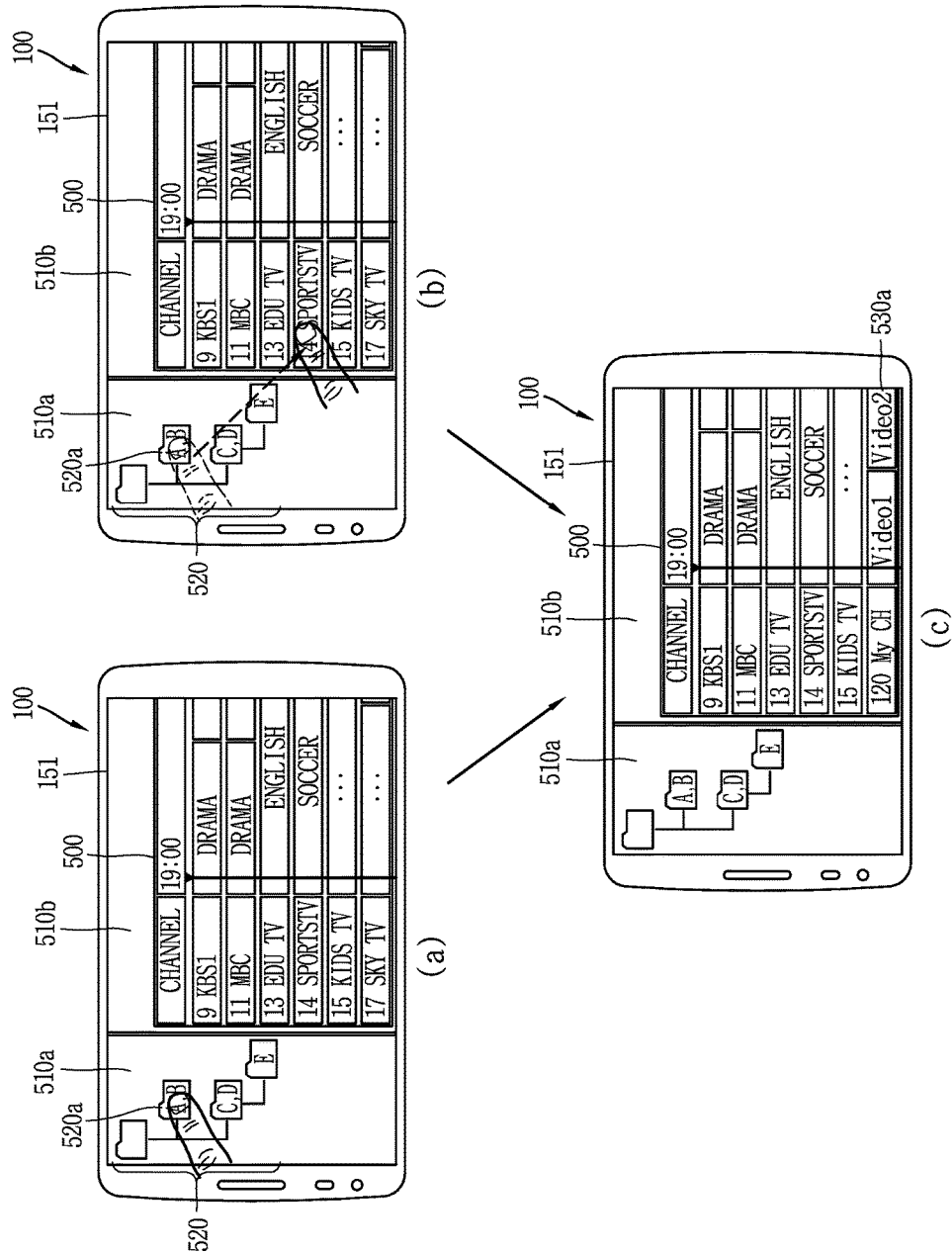

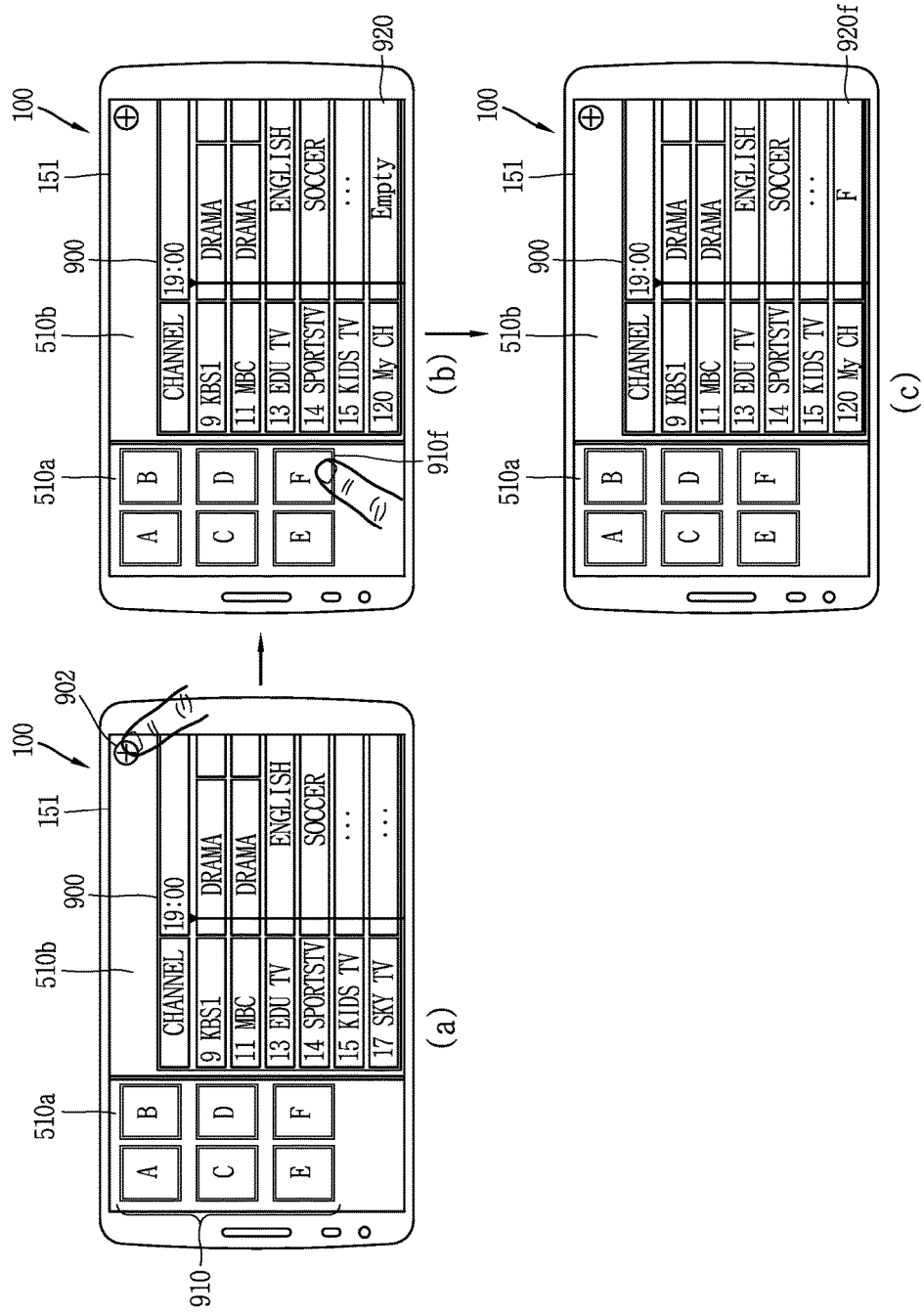

FIG. 9B
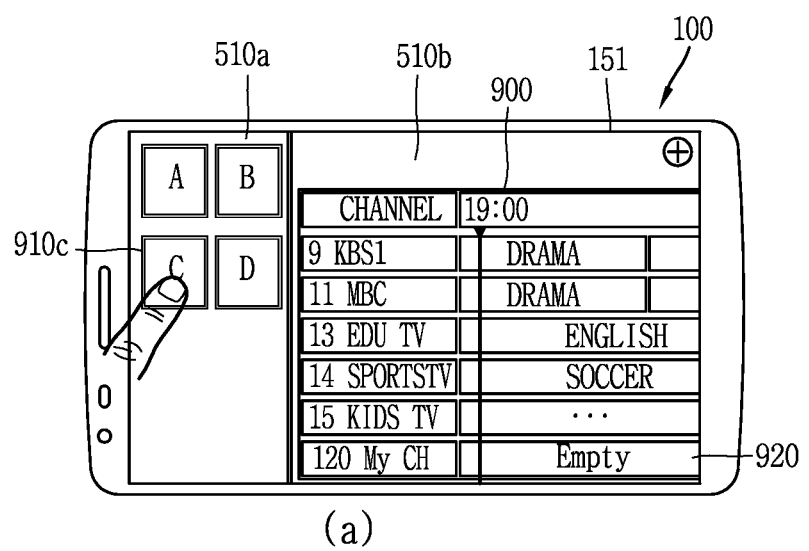
(a)
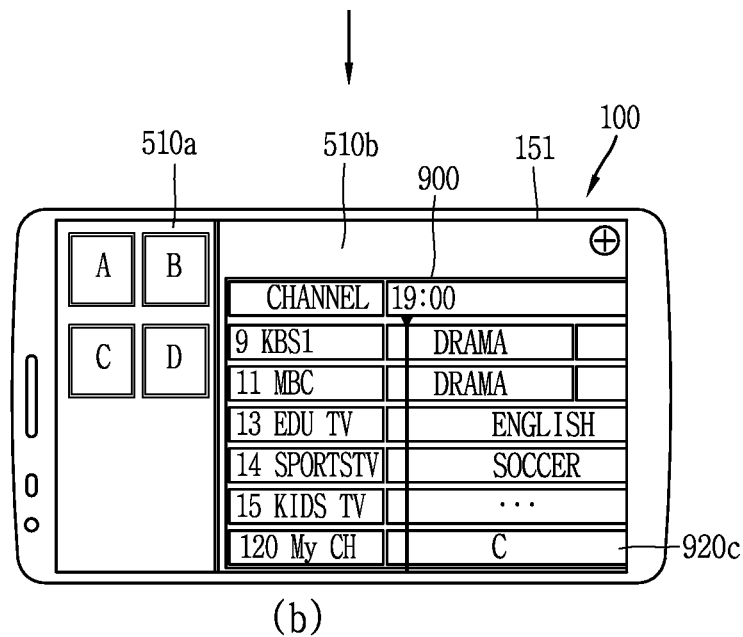
(b)

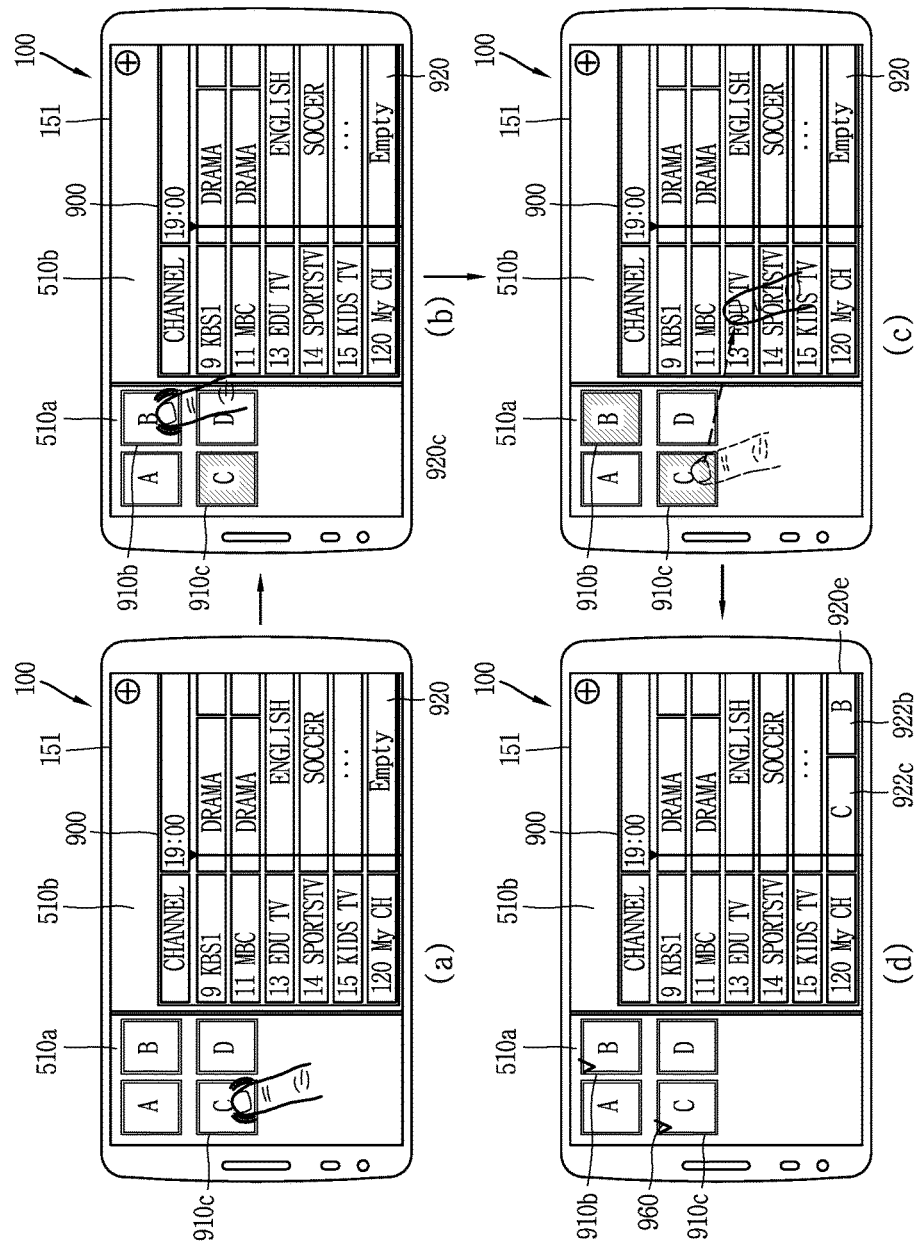

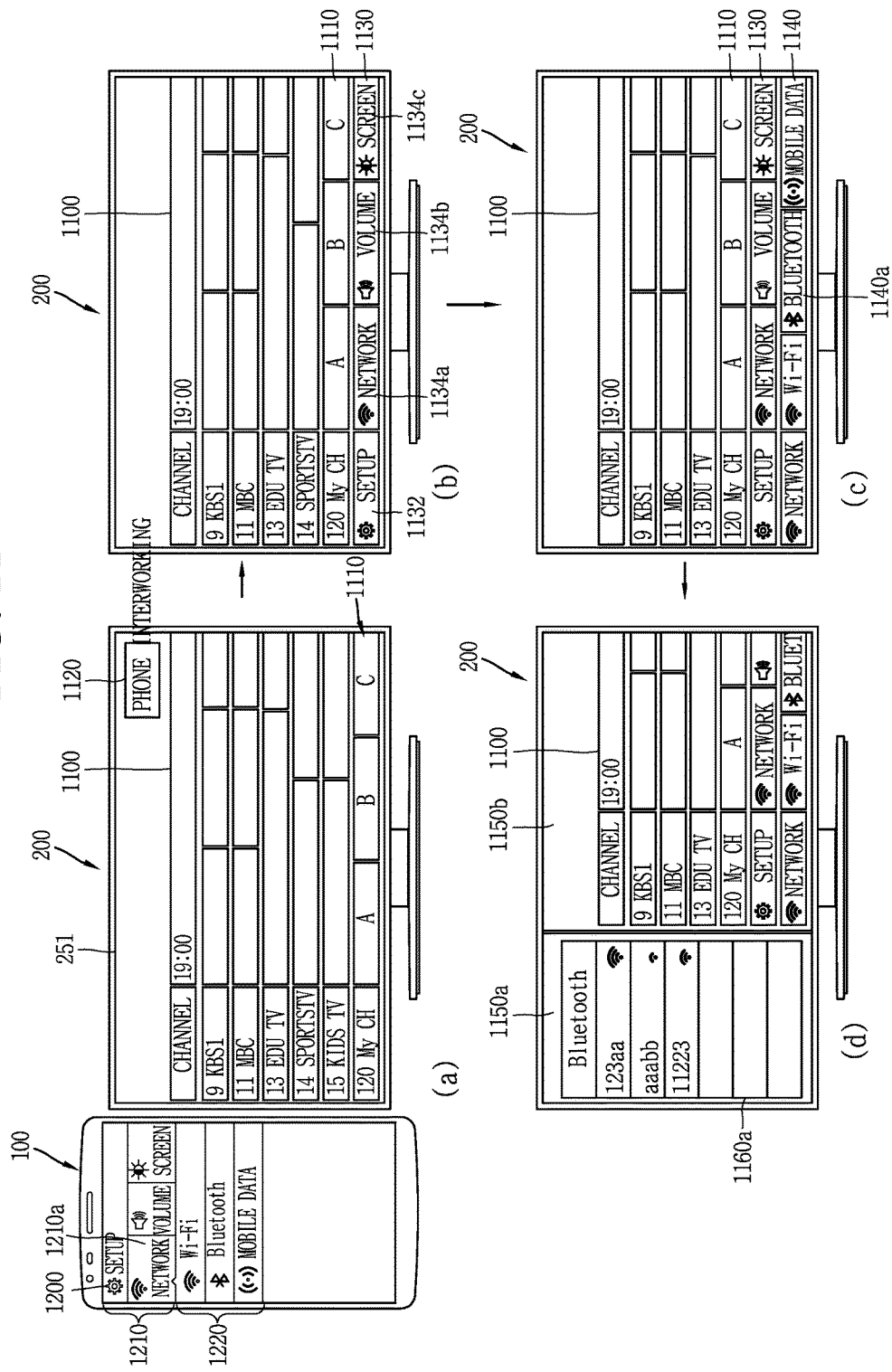

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0127834, filed on Sep. 9, 2015, the contents of which is incorporated by reference herein in its entirety.

BACKGROUND OF THE INVENTION

1. Field of the Invention

The present invention relates to a mobile terminal and a method for controlling the same that may perform wireless communication with a video output device.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, with the development of wireless communication technologies, functions of controlling a video output device by using a mobile terminal have been actively developed. The video output device, for example, may include a television, a monitor, a digital signage, etc.

It is general that a conventional video output device is controlled by an external input device (for example, remote controller). However, recently a mobile terminal can perform functions of an external input device, however.

In other words, the mobile terminal may turn on/off a video output device through wireless communication, change a channel or an output mode of the video output device, or control the volume of the video output device.

In this respect, as the video output device is controlled by the mobile terminal, the need of the development of technologies capable of controlling the video output device in various and optimized methods has been issued.

SUMMARY OF THE INVENTION

Therefore, an object of the present invention is to provide a mobile terminal and a method for controlling the same that may control a video output device in an optimized manner.

Another object of the present invention is to provide a mobile terminal and a method for controlling the same that may allow videos, which may be output from itself, to be output from a video output device in an optimized manner.

Other object of the present invention is to provide a mobile terminal and a method for controlling the same that may generate a virtual channel in an optimized manner, wherein the virtual channel is formed to output videos, which may be output from the mobile terminal, to be output from a video output device in accordance with the passage of time.

To achieve these and other advantages and in accordance with the purpose of the invention, as embodied and broadly described herein, according to one embodiment of the present invention, a mobile terminal comprises a wireless communication unit configured to perform wireless communication with a video output device; a touch screen; and a controller controlling the touch screen to output at least one folder to a first area of the touch screen and output an electronic program guide (EPG), which includes channel information related to the video output device, to a second area different from the first area, wherein the controller, if a predetermined touch is applied to any one of the at least one folder output to the first area, generates a virtual channel configured to output videos included in the any one folder from the video output device, and changes the EPG such that channel information corresponding to the generated virtual channel is reflected in the EPG.

According to the embodiment, the mobile terminal further comprises a memory formed to store videos, at least one of the videos stored in the memory is included in the folder output to the first area, and the controller generates the virtual channel to output the videos included in the folder, to which the touch is applied, from the video output device.

According to the embodiment, the controller, if a first one of the folders displayed on the first area is selected, generates a virtual channel in which videos included in the first folder are reflected, and if a second folder different from the first folder is selected, generates a virtual channel in which videos included in the second folder are reflected.

According to the embodiment, the first folder and the second folder, which belongs to the first folder, are displayed on the first area, and the controller generates virtual channels in different manners in accordance with a type of a predetermined touch applied to the first folder.

According to the embodiment, the controller, if a first touch is applied to the first folder, generates a virtual channel in which videos included in the first folder are reflected, and if a second touch different from the first touch is applied to the first folder, generates a virtual channel in which videos included in the first and second are all reflected.

According to the embodiment, the controller, if a lower folder exists in the folder to which the predetermined touch is applied, generates a plurality of virtual channels, and displays channel information corresponding to the generated virtual channels by reflecting the channel information in the EPG.

According to the embodiment, the videos included in the folder to which the predetermined touch is applied are reflected in a first one of the plurality of virtual channels, and videos included in the lower folder are reflected in a second one of the plurality of virtual channels, which is different from the first virtual channel.

According to the embodiment, the second virtual channel is set to a lower channel of the first virtual channel.

According to the embodiment, the controller, if the predetermined touch is applied to a higher folder of the folder to which the predetermined touch is applied in a state that channel information corresponding to the virtual channel is reflected in the EPG, generates a new virtual channel in which videos included in the higher folder are reflected, and changes the EPG such that channel information corresponding to the new virtual channel is reflected in the EPG.

According to the embodiment, a channel number of the virtual channel is changed based on that the new virtual channel is generated.

According to the embodiment, the controller, if the new virtual channel is generated in a state that the channel number of the virtual channel is set to a first channel number, sets a channel number of the new virtual channel to the first channel number and changes the channel number of the virtual channel from the first channel number to a second channel number different from the first channel number.

According to the embodiment, thumbnails corresponding to videos are displayed on the first area, and the controller generates a virtual channel on the basis of a user request and changes the EPG displayed on the second area based on that the predetermined touch is applied to the thumbnails, such that the videos corresponding to the thumbnails are reflected in the generated virtual channel.

According to the embodiment, the virtual channel is generated based on at least one of the predetermined touch applied to the thumbnails and a touch applied to a graphic object associated with a function of generating a virtual channel.

According to the embodiment, the controller performs different operations based on that different touches are applied to the thumbnails.

According to the embodiment, the controller reflects videos corresponding to the thumbnails in the generated virtual channel if a first touch is applied to the thumbnails, and selects the thumbnails if a second touch different from the first touch is applied to the thumbnails.

According to the embodiment, the controller, if the predetermined touch is applied in a state that a plurality of thumbnails are selected, reflects a plurality of videos corresponding to the plurality of thumbnails in the generated virtual channel.

According to the embodiment, a play order of the plurality of videos reflected in the virtual channel is determined based on the selected order of the plurality of thumbnails.

According to the embodiment, the controller, if an event occurs, reflects information corresponding to the event in the virtual channel, such that the information corresponding to the event is output from the video output device.

In another aspect of the present invention, according to one embodiment of the present invention, a method for controlling a mobile terminal, which performs wireless communication with a video output device comprises the steps of outputting at least one folder to a first area of a touch screen and outputting an electronic program guide (EPG), which includes channel information related to the video output device, to a second area different from the first area; if a predetermined touch is applied to any one of the at least one folder output to the first area, generating a virtual channel configured to output videos included in the any one folder from the video output device; and changing the EPG such that channel information corresponding to the generated virtual channel is reflected in the EPG.

According to the embodiment, at least one of videos stored in a memory is included in the folder output to the first area, and the step of generating a virtual channel includes generating the virtual channel such that the videos included in the folder to which the touch is applied are output from the video output device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 5 is a conceptual view illustrating the control method of FIG. 4;

FIGS. 9a, 9b and 9c are conceptual views illustrating a method for generating a virtual channel according to the second embodiment of the present invention;

FIG. 11 is a conceptual view illustrating a method for changing a setup screen output from a mobile terminal by using an EPG in a video output device according to the present invention.

DETAILED DESCRIPTION OF THE INVENTION

Figure 1A:
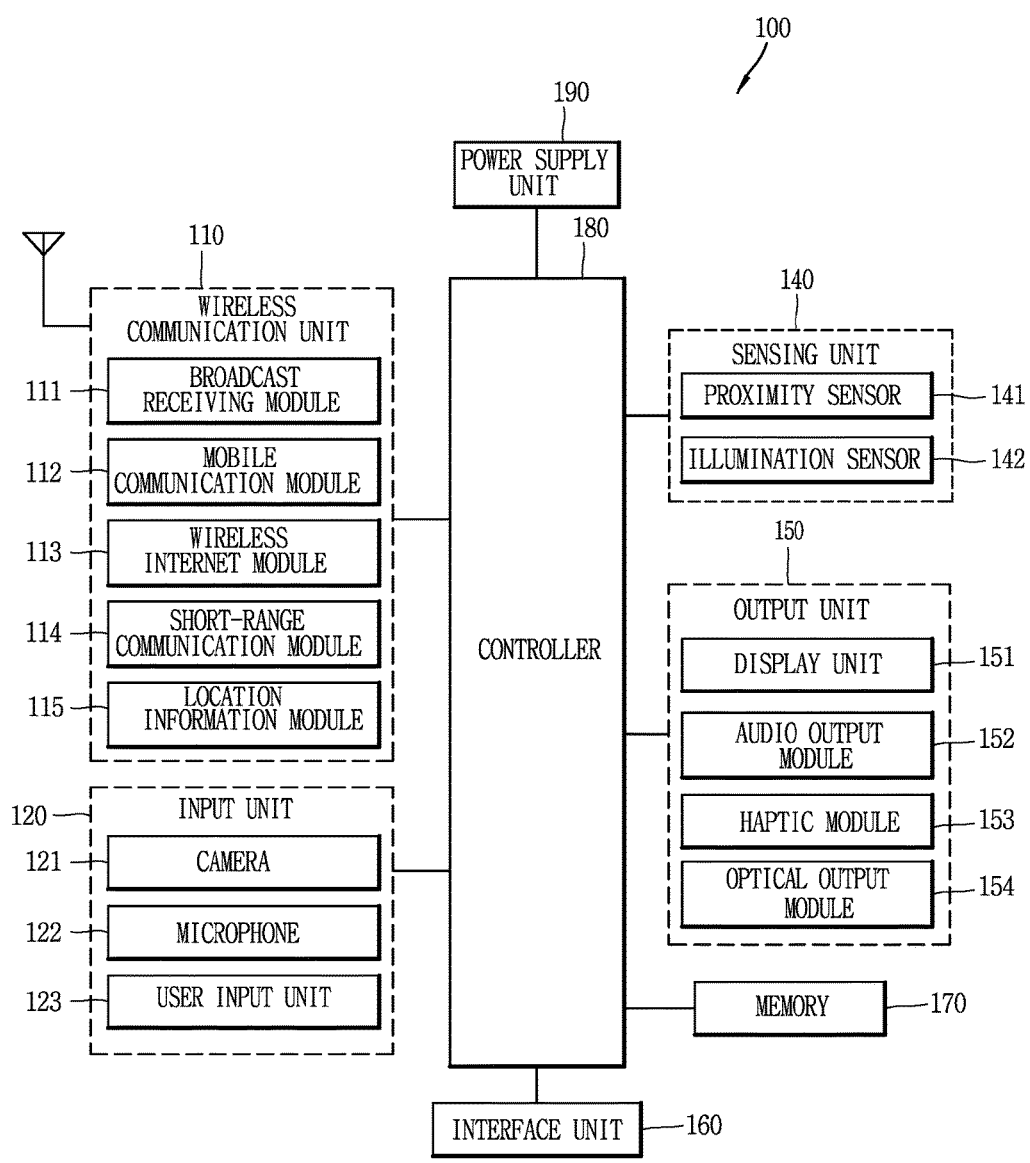
FIG. 1a is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
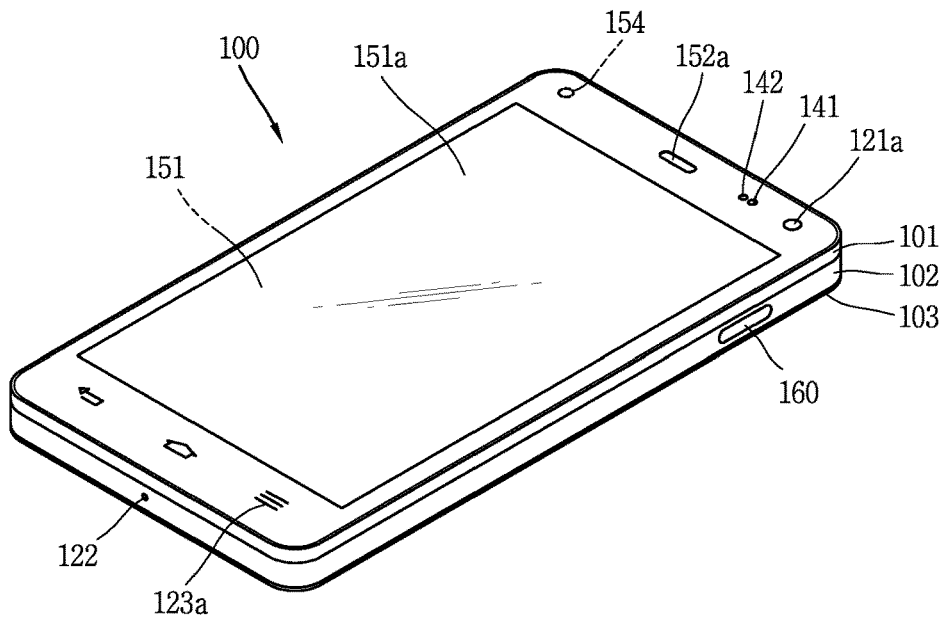
FIGS. 1b and 1c are conceptual views illustrating an example of a mobile terminal according to the present invention, which is viewed from different directions.
Figure 1C:
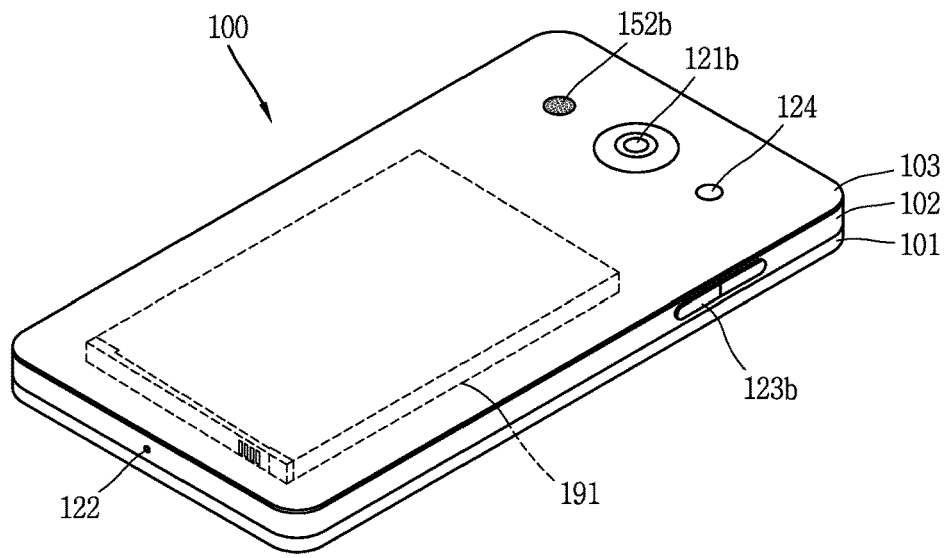

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 121, which is one type of audio input device for inputting an audio signal, and a user input unit 122 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 121, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 122 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a video output device that may perform wireless communication with a mobile terminal according to one embodiment of the present invention, which includes at least one of the aforementioned elements, will be described.

Figure 2:
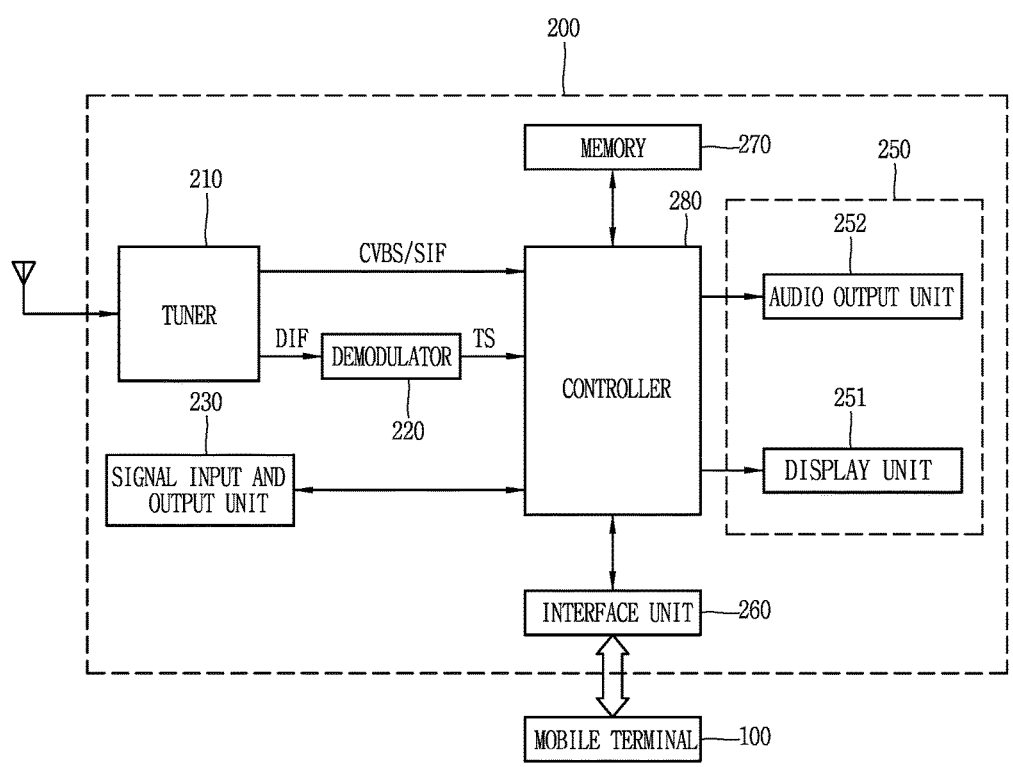
FIG. 2 is a block diagram illustrating a video output device according to the present invention.

FIG. 2 is a block diagram illustrating a video output device according to the present invention.

In this specification, the video output device includes all of a device for receiving and displaying a broadcasting signal, a device for recording and playing moving images, and a device for recording and playing audio. Hereinafter, the image display device which is a television will be described exemplarily.

FIG. 2 is a block diagram illustrating a video output device 200 according to the present invention. The video output device 200 includes a tuner 210, a demodulator 220, a signal input and output unit 230, an interface unit 260, a controller 280, a memory 270, and an output unit 250. The output unit includes a display unit 251 and an audio output unit 252.

Also, the video output device 200 may further include an external input device. The external input device is an external device that may remotely control the video output device 200, and may include a remote controller and a mobile terminal 100, for example. The external input device is a separate device different from the video output device 200 but may be included as an element of the video output device 200. Hereinafter, the external input device which is the mobile terminal 100 according to the present invention will be described exemplarily.

Referring to FIG. 2, the tuner 210 selects a radio frequency (RF) broadcast signal corresponding to a user-selected channel from RF broadcast signals received via an antenna, and converts the selected RF broadcast signal into an intermediate frequency signal or a baseband video or audio signal. For example, when the selected RF broadcast signal is a digital broadcast signal, the tuner 210 converts the RF broadcast signal into a digital IF signal (DIF). On the other hand, when the RF broadcast signal is an analog broadcast signal, the tuner 210 converts the RF broadcast signal into an analog baseband video or audio signal (CVBS/SIF). As described above, the tuner 210 may be a hybrid tuner that may process the digital broadcast signal and the analog broadcast signal.

The digital IF signal (DIF) output from the tuner 210 may be input to the demodulator 220, and the analog baseband video or audio signal (CVBS/SIF) output from the tuner 210 may be input to the controller 280. The tuner 110 may receive an RF broadcast signal of a single carrier according to an advanced television system committee (ATSC) mode or RF broadcast signal of multiple carriers according to digital video broadcasting (DVB) mode.

Although one tuner 210 is shown, the video output device 200 may include a plurality of tuners, for example, first and second tuners without limitation to FIG. 2. In this case, the first tuner may receive a first RF broadcast signal corresponding to a user-selected broadcast channel, and the second tuner may receive second RF broadcast signals corresponding to previously stored broadcast channels sequentially or periodically. The second tuner may convert the RF broadcast signal into a digital IF signal (DIF) or analog baseband video or audio signal (CVBS/SIF) in the same manner as the first tuner.

The demodulator 220 receives the digital IF signal (DIF) converted by the tuner 210 and then performs a demodulation operation on the received signal (DIF). For example, if the digital IF signal output from the tuner 210 follows the ATSC mode, the demodulator 220 performs 8-VSB (8-vestigal side band) demodulation. At this time, the demodulator 220 may perform channel decoding such as trellis decoding, de-interleaving, and Reed-Solomon decoding. To this end, the demodulator 220 may include a trellis decoder, a de-interleaver, a Reed Solomon decoder and the like.

For another example, if the digital IF signal output from the tuner 210 follows the DVB mode, the demodulator 220 may perform coded orthogonal frequency division modulation (COFDMA). At this time, the demodulator 220 may perform channel decoding such as convolution decoding, de-interleaving, and Reed-Solomon decoding. To this end, the demodulator 220 may include a convolution decoder, a de-interleaver, a Reed Solomon decoder and the like.

The signal input and output unit 230 may be connected to an external device to perform signal input and output operations. To this end, the signal input and output unit 230 may include an audio/video (A/V) input and output unit (not shown) and a wireless communication unit (not shown).

The A/V input and output unit may include an Ethernet terminal, a USB terminal, a CVBS (Composite Video Banking Sync) terminal, a component terminal, an S-video terminal (analog), a DVI (Digital Visual Interface) terminal, an HDMI (High Definition Multimedia Interface) terminal, an MHL (Mobile High-definition Link) terminal, an RGB terminal, a D-SUB terminal, an IEEE 1394 terminal, an SPDIF terminal, a Liquid HD terminal, and the like. The digital signal input through these terminals may be forwarded to the controller 280. At this time, the analog signal input through the CVBS terminal and the S-video terminal may be converted to the digital signal through an analog-to-digital converter (not shown) and forwarded to the controller 280.

The wireless communication unit may perform wireless Internet access. For example, the wireless communication unit may perform wireless Internet access by using WLAN (Wireless LAN) (Wi-Fi), Wibro (Wireless broadband), Wimax (World Interoperability for Microwave Access), HSDPA (High Speed Downlink Packet Access), and the like. Also, the wireless communication unit may perform short range wireless communications with other electronic devices. For example, wireless communication unit may perform short range wireless communications by using Bluetooth, radio frequency identification (RFID), infrared data association (IrDA), ultra wideband (UWB), ZigBee, digital living network alliance (DLNA) and the like.

Also, the wireless communication unit may perform wireless communication with the mobile terminal 100 through wireless communication. For example, the wireless communication unit may forward a video signal, an audio signal and a data signal, which are received through the wireless communication unit 110 of the mobile terminal 100, to the controller 280. Also, the wireless communication may transmit the video signal, the audio signal and the data signal, which are transmitted from the controller 280, to the mobile terminal 100 through wireless communication.

The signal input and output unit 230 may forward video signals, audio signals and data signals, which are provided from an external device such as a Digital Versatile Disk (DVD) player, a Blu-ray player, a game device, a camcorder, a computer (e.g., notebook computer), a portable device, and a smart phone, to the controller 280. Also, the signal input and output unit 230 may forward video signals, audio signals and data signals of various media files stored in an external storage device such as a memory device and a hard disk to the controller 280. Also, the signal input and output unit 230 may output the video signals, the audio signals and the data signals, which are processed by the controller 280, to another external device.

The signal input and output unit 230 may be connected to a set-top box, for example, a set-top box for Internet Protocol TV (IPTV), through at least one of the above-described terminals to enable signal input and output operations. For example, the signal input and output unit 230 may forward video signals, audio signals and data signals, which are processed by the set-top box for IPTIV, to the controller 280 so as to enable bidirectional communication, and may forward the signals processed by the controller 280 to the set-top box for IPTV. In this case, the IPTV may include ADSL-TV, VDSL-TV, FTTH-TV, and the like, which are identified from one another in accordance with a transmission network.

The digital signal output from the demodulator 220 and the signal input and output unit 230 may include a stream signal (TS). The stream signal TS may be a signal where a video signal, an audio signal and a data signal are multiplexed. For example, the stream signal may be MPEG-2 Transport Stream (TS) where a video signal of an MPEG-2 specification and an audio signal of Dolby AC-3 specification are multiplexed. In this case, the MPEG-2 TS may include a 4 byte header and a 184 byte payload.

The interface unit 260 may receive an input signal for power control, channel selection and screen setup from the external input device (mobile terminal 100) or transmit the signal processed by the controller 280 to the external input device (mobile terminal 100). The interface unit 260 and the external input device (mobile terminal 100) may be connected with each other in a wired manner or wirelessly.

An example of the interface unit 260 may include a sensor unit. The sensor unit is configured to sense an input signal from an external input device, for example, a remote controller or the mobile terminal 100.

A network interface unit (not shown) provides an interface for connecting the video output device 200 with wire/wireless networks including Internet network. The network interface unit may include an Ethernet terminal, for example, for wire network connection. Wireless LAN (WLAN)(Wi-Fi), Wireless broadband (Wibro), World Interoperability for Microwave Access (Wimax), High Speed Downlink Packet Access (HSDPA) may be used for the wireless network connection.

The network interface unit (not shown) may be connected to a predetermined web page through a network. That is, the network interface unit may transmit or receive data to or from a corresponding server by accessing a predetermined web page through a network. In addition, the network interface unit may receive contents or data provided by a contents provider or a network manager. That is, the network interface unit may receive contents, such as movies, advertisements, games, VOD and broadcast signals, and contents related information, which are provided from a contents provider or network provider, through a network. Also, the network interface unit may receive update information and update files of firmware provided by the network manager. Also, the network interface unit may transmit data to Internet or contents provider or network manager.

Also, the network interface unit may select and receive a desired one of applications opened to the public, through a network.

The controller 280 may control an overall operation of the video output device 200. In more detail, the controller 280 is configured to control generation and output of an image. For example, the controller 280 may control the tuner 210 to allow a user to tune the RF broadcast signal corresponding to the user-selected channel or previously store channel. Although not shown, the controller 280 may include a demultiplexer, an image processor, an audio processor, a data processor, an on screen display (OSD) generator, and the like. Also, the controller 280 may include a CPU or peripheral devices in hardware.

The controller 280 may demultiplex a stream signal TS, for example, an MPEG-2 TS to separate it into a video signal, an audio signal, and a data signal.

The controller 280 may process the demultiplexed video signal, for example, perform decoding for the demultiplexed video signal. In more detail, the controller 280 may decode a coded video signal of the MPEG-2 specification by using an MPEG-2 decoder, and may decode a coded video signal of the H.264 specification according to a digital multimedia broadcasting (DMB) mode or a DVB-H by using an H.264 decoder. Also, the controller 280 may process the video signal to adjust brightness, tint, color, and the like, of an image. The video signal processed by the controller 280 may be forwarded to the display unit 251 or may be forwarded to an external output device (not shown) through an external output terminal.

The controller 280 may process the demultiplexed audio signal, for example, decoding for the demultiplexed audio signal. In more detail, the controller 280 may decode the coded audio signal of the MPEG-2 specification by using an MPEG 2 decoder, decode the coded audio signal of an MPEG 4 bit sliced arithmetic coding (BSAC) according to a DMB mode by using an MPEG 4 decoder, and decode the coded audio signal of the advanced audio codec (AAC) specification of MPEG 2 according to a satellite DMB mode or DVB-H by using an AAC decoder. Also, the controller 280 may process base, treble, volume control, and the like. The audio signal processed by the controller 280 may be forwarded to the audio output unit 252, for example, a speaker, or may be forwarded to the external output device.

The controller 280 may process an analog baseband video or audio signal (CVBS/SIF). In this case, the analog baseband video or audio signal (CVBS/SIF) input to the controller 280 may be an analog baseband video or audio signal output from the tuner 210 or the signal input and output unit 230. The processed video signal may be displayed through the display unit 251, and the processed audio signal may be output through the audio output unit 252.

The controller 280 may process the demultiplexed data signal, for example, perform decoding for the demultiplexed data signal. In this case, the data signal may include electronic program guide (EPG) information including a start time, an end time, or the like of a broadcast program broadcasted in each channel. In an ATSC mode, the EPG information may include ATSC-program and system information protocol (ATSC-PSIP) information, and in a DVB mode, the EPG information may include DVB-service information (DVB-SI). The ATSC-PSIP information or the DVB-SI may be included in a header (4 byte) of an MPEG-2 TS.

The controller 280 may perform a control operation to process OSD. In more detail, the controller 280 may generate an OSD signal for displaying various types of information in a graphic or text form on the basis of at least one of a video signal and a data signal or an input signal received from the external input device (mobile terminal 100). The OSD signal may include various types of data such as a user interface screen, a menu screen, a widget, an icon, and the like.

The memory 270 may store a program for signal processing or controlling of the controller 280, or may store a processed video signal, audio signal, and data signal. The memory 270 may include at least one of a flash memory, a hard disk type memory, a multimedia card micro type memory, a card type memory (e.g., an SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The display unit 251 may convert the video signal, the data signal, the OSD signal, and the like, which are processed by the controller 150, into RGB signals to generate a driving signal. As a result, the display unit 251 outputs an image. The display unit 251 may be implemented in various forms such as a plasma display panel (PDP), a liquid crystal display (LCD), a thin film transistor-LCD (TFT-LCD), an organic light emitting diode (OLED) display, a flexible display, a three-dimensional (3D) display, an e-ink display, and the like. Also, the display unit 252 may be implemented as a touch screen to serve as an input device.

The audio output unit 252 may output an audio signal, for example, a stereo signal or a 5.1-channel signal, which is processed by the controller 150. The audio output unit 252 may be implemented as various types of speakers.

Meanwhile, an image capturing unit (not shown) for capturing an image of the user may be further provided. The image capturing unit (not shown) may be implemented as, but not limited to, a single camera. The image capturing unit may be implemented as a plurality of cameras. Image information captured by the image capturing unit (not shown) may be input to the controller 280.

Meanwhile, in order to sense a user gesture, as described above, a sensing unit (not shown) including at least one of a touch sensor, a voice sensor, a position sensor, and an operating sensor may be further provided in the video output device 200. A signal sensed by the sensing unit (not shown) may be forwarded to the controller 280 through the interface unit 260.

The controller 280 may sense a user gesture according to the image captured by the image capturing unit (not shown) or the signal sensed by the sensing unit (not shown), separately, or by combining these signals.

A power supply unit (not shown) supplies a corresponding power to the video display device 200. In particular, the power supply unit (not shown) may supply a power to the controller 280 that may be implemented in the form of a system on chip (SOC), the display unit 251 for displaying an image, and the audio output unit 252 for outputting audio.

To this end, the power supply unit (not shown) may include a converter (not shown) for converting an alternating current (AC) power into a direct current (DC) power. Meanwhile, for example, in the case that the display unit 251 is implemented as a liquid crystal panel having a plurality of backlight lamps, the power supply unit (not shown) may further include an inverter (not shown) that may be able to perform a pulse width modulation (PWM) operation for the purpose of varying luminance or dimming driving.

The external input device (mobile terminal 100) may be connected to the interface unit 260 in a wired manner or wirelessly, and may transmit an input signal generated according to a user input to the interface unit 260. The external input device (mobile terminal 100) may include a remote controller, a mouse, a keyboard, and the like. The remote controller may transmit an input signal to the interface unit 260 through Bluetooth, RF communication, infrared communication, ultra-wideband (UWB), ZigBee, and the like. The remote controller may be implemented as a spatial remote control device. The spatial remote control device may generate an input signal by sensing an operation of a body in a space.

The video output device 200 may be implemented as a fixed type digital broadcast receiver capable of receiving at least one of an ATSC-type (8-VSB-type) digital broadcast, a DVB-T type (COFDM-type) digital broadcast, an ISDB-T type (BST-OFDM-type) digital broadcast, and the like. Also, the video output device 200 may be implemented as a mobile digital broadcast receiver capable of receiving at least one of a terrestrial digital multimedia broadcasting-type digital broadcast, a satellite DMB-type digital broadcast, an ATSC-M/H type digital broadcast, a DVB-H type (COFDM type) digital broadcast, a media forward link only type digital broadcast, and the like. Also, the video output device 200 may be implemented as a digital broadcast receiver for a cable, satellite communication, and an IPTV.

Hereinafter, embodiments according to the mobile terminal configured as above and the control method that may be implemented in the video output device will be described with reference to the accompanying drawings. It will be apparent to those skilled in the art that the present invention may be embodied in another specific form within the range that does not depart from spirits and essential features of the present invention.

Figure 3A:
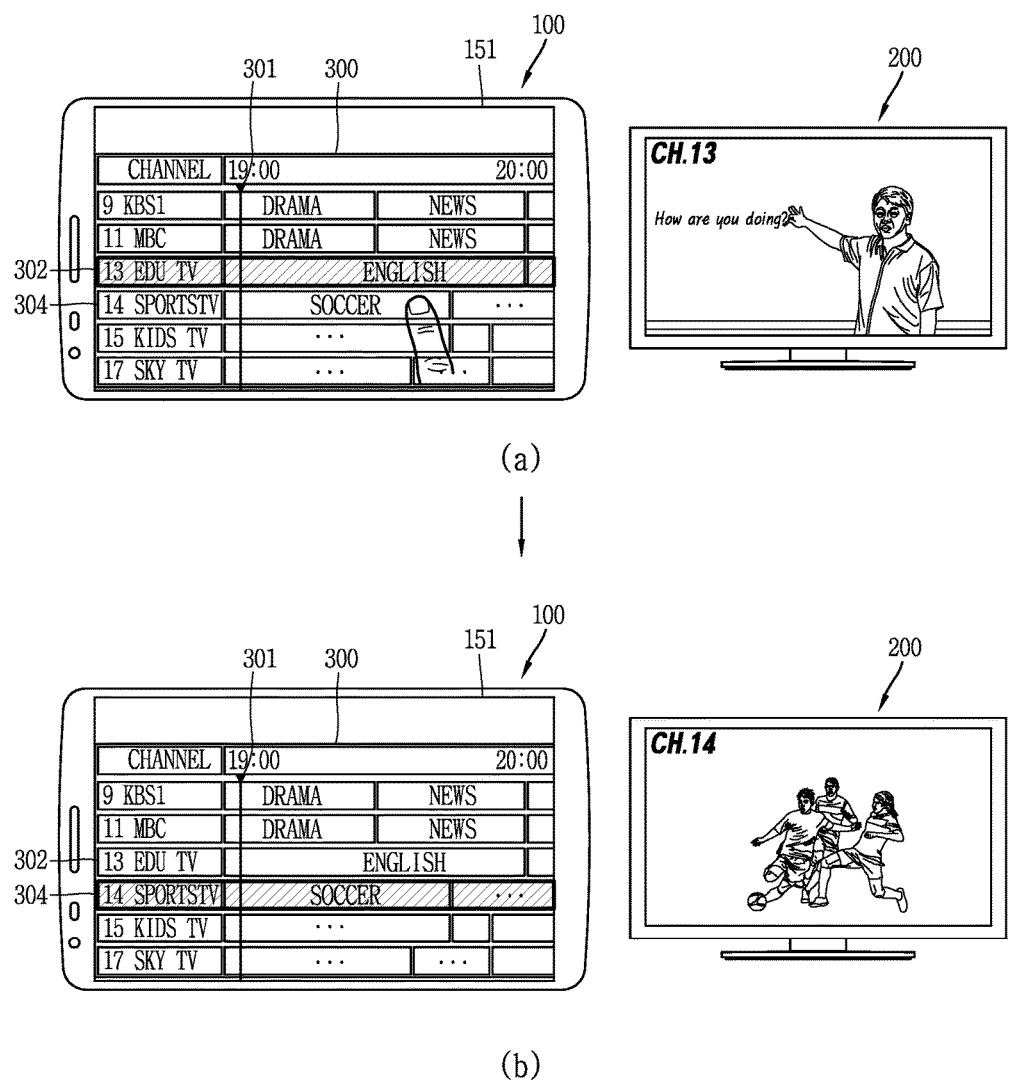
FIGS. 3a and 3b are conceptual view illustrating an electronic program guide (EPG) and a virtual channel according to one embodiment of the present invention.
Figure 3B:
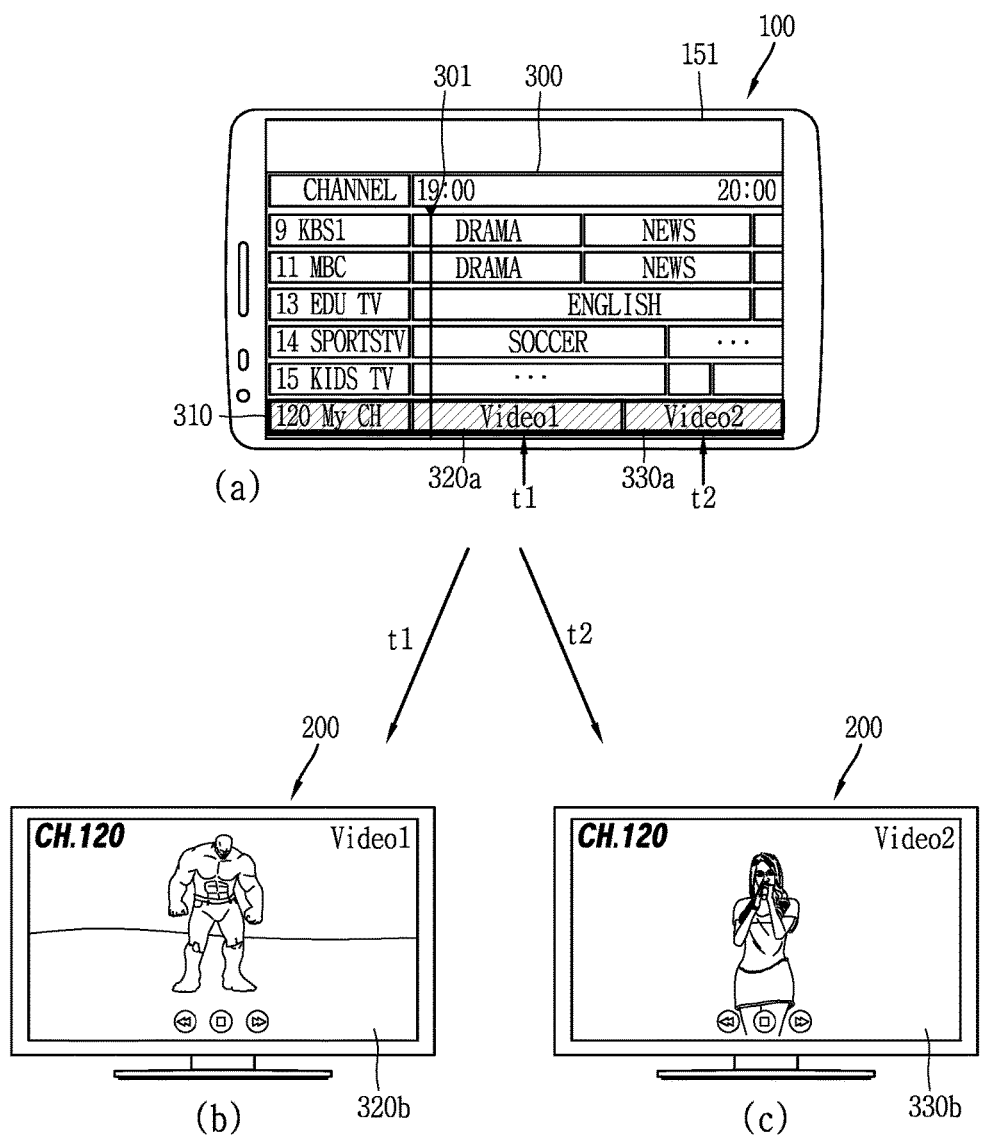

FIGS. 3a and 3b are conceptual view illustrating an electronic program guide (EPG) and a virtual channel according to one embodiment of the present invention.

Referring to FIG. 3a, the mobile terminal 100 and the video output device 200 according to the present invention may guide a program of broadcast (for example, terrestrial broadcast, cable, satellite broadcast, IPTV, etc.) that may be output from the video output device 200, and may output an electronic program guide (EPG) 300, which provides a broadcast schedule table. The EPG 300 may be implemented in the form of a pop-up window, screen information, etc. The EPG 300 may be displayed together with a program (video) output from the video output device 200 or may be displayed by being superimposed on the program. Also, if the EPG 300 is output, an output size of the program (video) output from the video output device 200 may be changed (for example, may be smaller).

The EPG 300 may include channel information 302 and 304 related to the video output device 200. In more detail, the EPG 300 may be configured to indicate a program (video) broadcasted per broadcast management server (per broadcasting company, per broadcast station) and per broadcast channel in accordance with time/date. Also, an indicator 301 indicating a current time may be displayed on the EPG 300.

The video output device 200 may receive a broadcast signal (or signal related to broadcast) from a broadcast management server through a broadcast channel and output a program corresponding to the broadcast signal by using at least one of the display unit 251 and the audio output unit 252. The program (video) may include at least one of moving video, still video and audio data.

In this case, channel information related to the video output device 200 may include a channel number of a channel (broadcast channel) configured to receive a broadcast signal from a broadcast management server, a name (or channel name) of a broadcast station that transmits a broadcast signal through the channel, and information (for example, a program name and start/end time of a program) related to a program (video) broadcasted (output) through the channel.

Meanwhile, the EPG 300 related to the video output device 200 connected to perform wireless communication may be output to the touch screen 151 of the mobile terminal 100 according to the present invention, as shown in (a) of FIG. 3a. The EPG 300 displayed on the touch screen 151 of the mobile terminal 100 may include channel information (for example, a channel number of at least one channel configured in the video output device 200, a name of the channel, and information (program name) related to video broadcasted through the channel) related to the video output device 200 connected to perform wireless communication.

The controller 180 of the mobile terminal 100 may output the EPG 300 to the touch screen 151 in various manners.

For example, if the controller 180 is connected to the video output device through the wireless communication unit 100 to perform wireless communication, the controller 180 may receive information related to the EPG from the wireless communication unit of the video output device 200. The information related to the EPG may be the EGP, or may be information (for example, channel information) required to generate the EPG.

If the information (for example, channel information) required to generate the EPG is received from the video output device 200, the controller 180 may generate the EPG 300 by using the received information.

Also, the controller 180 may output the EPG 300 related to the video output device 200 to the touch screen 151 by using the information related to the EPG.

However, the controller 180 may directly receive information related to the EPG from the broadcast management server through the wireless communication unit 110 without limitation to the above example.

Also, the EPG 300 may be generated by the broadcast management server and then transmitted to at least one of the mobile terminal 100 and the video output device 200, and may be generated from at least one of the mobile terminal 100 and the video output device 200 on the basis of the signal (broadcast signal, broadcast program related information, etc.) related to broadcast received from the broadcast management server.

In the present invention, the EPG 300 related to the video output device 200 may be output to the mobile terminal 100 not the video output device 200, whereby a viewer may view the video output device 200 without any interruption.

Although not shown, it will be apparent that the EPG may be output to the display unit 251 of the video output device 200.

In the present invention, the video output device 200 may be controlled using the EPG 300 output to the touch screen 151.

In FIG. 3a, first channel information 302 and second channel information 304 are included in the EPG 300 displayed on the touch screen 151 of the mobile terminal 100.

The video output device 200 may receive a broadcast signal through a first channel corresponding to the first channel information. In this case, a video (program) corresponding to the broadcast signal received through the first channel may be output (broadcasted) to the display unit 151 of the video output device 200.

In this case, receiving the broadcast signal through the channel may mean that a broadcast signal corresponding to a channel selected by a user is selected from broadcast signals received from the broadcast management server through the tuner 210 (or broadcast receiving module 111 of the mobile terminal 100) of the video output device 200.

That is, the channel may mean a path (transmission path) for receiving a broadcast signal, or may mean a number (channel number) for identifying the broadcast signals received from each broadcast management server from one another.

Also, for convenience of description, hereinafter, "a video received through a channel is output" or "a video corresponding to a channel is output" will be expressed. This expression may include that "a broadcast signal is received through a channel and a video (program) corresponding to the received broadcast signal is output" or "a broadcast signal corresponding to a channel (number) selected by a user is selected and a video corresponding to the selected broadcast signal is output".

If the video corresponding to the first channel is being output from the video output device 200, the controller 180 may apply a graphic effect of the first channel information corresponding to the first channel from the channel information included in the EPG 300 to allow the first channel information to be identified from another channel information, whereby the video output device 200 may guide that the video received through the first channel is being output.

In this state, in the present invention, as shown in (a) of FIG. 3a, the second channel information 304 different from the first channel information 302 may be selected (touched) from the EPG 300 output to the touch screen 151 of the mobile terminal 100. In this case, in the present invention, as shown in (b) of FIG. 3a, the first channel configured in the video output device 200 may be changed to the second channel corresponding to the second channel information 304, and the video received through the second channel may be output to the display unit 251 of the video output device 200. That is, in the present invention, if any one of the channel information included in the EPG 300 is selected, the video received through the channel corresponding to the selected channel information may be output to the display unit 251 of the video output device 200.

In more detail, if the second channel information 304 included in the EPG 300 output to the touch screen 151 is selected, the controller 180 may transmit information (or information related to the second channel) indicating that the second channel information 304 has been selected, to the video output device 200 through the wireless communication unit 110.

If the information indicating that the second channel information 304 has been selected is received from the mobile terminal 100, the controller 280 of the video output device 200 may output the video received through the second channel corresponding to the second channel information 304 to the display unit 251 of the video output device 200.

At this time, the EPG 300 displayed on the touch screen 151 of the mobile terminal 100 may apply a graphic effect to the second channel information 304 corresponding to the second channel to indicate that the video received through the second channel is displayed by the video output device 200.

Through the aforementioned configuration, the present invention may provide a user interface that may output the EPG of the video output device through the mobile terminal and control the video output device by using the EPG.

Meanwhile, the mobile terminal 100 of the present invention may include the wireless communication unit 110 configured to perform wireless communication with the video output device 200. Also, in the present invention, a channel may be generated to output video (information), which may be output from the mobile terminal 100, from the video output device 200. In more detail, the controller 180 may generate a channel (hereinafter, referred to as 'virtual channel') formed to output a video, which may be output from the mobile terminal 100, from the video output device on the basis of a user request.

The video, which may be output from the mobile terminal 100, may include moving video, still video, 3D stereoscopic video, etc. Also, the video, which may be output from the mobile terminal 100, may be a video stored in the memory 170, a video received from an external server, Internet, etc. through wireless communication, or the like.

The controller 180 may reflect (apply, configure, store) the video, which may be output from the mobile terminal 100, in the virtual channel. The video reflected in the virtual channel may be output from the video output device 200 in accordance with the passage of time. At this time, if a plurality of videos are reflected in the virtual channel, the videos reflected in the virtual channel may be output from the video output device 200 sequentially in accordance with the passage of time.

Reflecting the video in the virtual channel is different from transmission of a video from the mobile terminal to the video output device to simply output a video, which may be output from the mobile terminal, from the video output device, or streaming type transmission.

In more detail, in the present invention, at least one video, which may be output from the mobile terminal, may be reflected in the virtual channel, whereby the at least one video may be output from the video output device 200 sequentially in accordance with the passage of time even though there is no separate user request (touch, video output request, etc.). However, if the video is transmitted from the mobile terminal 100 to the video output device 200 to simply output the video, which may be output from the mobile terminal 100, from the video output device 200, a new request (touch, video output request, etc.) is required for each video.

In the present invention, the concept of the virtual channel is introduced, whereby the mobile terminal 100 may serve as a broadcast management server. That is, the present invention may provide a user interface that may reflect the video, which may be output from the mobile terminal 100, in the virtual channel to output the video reflected in the virtual channel from the video output device 200 like broadcast (or program) transmitted from any one broadcast management server in accordance with the passage of time.

As described above, the video, which may be output from the mobile terminal, may be output from the video output device through the virtual channel by using the wireless communication units provided in the mobile terminal and the video output device.

The virtual channel may be configured (generated) in various manners. A detailed method for generating the virtual channel and reflecting a video in the virtual channel will be described later with reference to FIGS. 4 to 9c.

As shown in (a) of FIG. 3b, if the virtual channel is generated to output the video, which may be output from the mobile terminal 100, from the video output device 200, channel information 310 corresponding to the virtual channel may be displayed on the EPG 300 displayed on the touch screen 151. Also, a channel number may be given to the virtual channel.

The channel information 300 corresponding to the virtual channel may include information 320a and 330a (for example, a name set to the video, start/end time of the video, etc.) related to the video reflected in the virtual channel, a name of the virtual channel, and a channel number of the virtual channel.

The case where first and second videos, which may be output from the mobile terminal 100, are reflected in the virtual channel is shown In (a) of FIG. 3b. In this case, the channel information 310 corresponding to the virtual channel displayed on the EPG 300 may include (display) the information 320a related to the first video and the information 330a related to the second video.

As described above, the video output device 200 may output the videos 320b and 330b reflected in the virtual channel to the display unit 251 sequentially in accordance with the passage of time.

For example, if the current time is set to t1, the controller 280 of the video output device 200 may output the first video 320b reflected (set) to be output at t1 among the videos reflected in the virtual channel, to the display unit 251 of the video output device 200. Afterwards, if the current time is set to t2 after the passage of time, the controller 280 of the video output device 200 may output the second video 330b reflected (set) to be output at t2 among the videos reflected in the virtual channel, to the display unit 251 of the video output device 200.

To this end, the controller 180 may transmit the information related to the virtual channel to the video output device 200. The information related to the virtual channel may include the video (data) reflected in the virtual channel and information (for example, a name of the video reflected in the virtual channel and start/end time of the video) related to the video reflected in the virtual channel. The controller 180 may transmit every kind of the information related to the virtual channel to the video output device through the wireless communication unit 110, or may transmit the information in a streaming mode.

Through the aforementioned configuration, in the present invention, the mobile terminal may serve as any one broadcast station, whereby a control method and user interface for outputting at least one video, which may be output from the mobile terminal, from the video output device in an optimized manner may be provided.

Hereinafter, the method for generating the virtual channel will be described in more detail with reference to the accompanying drawings.

Figure 4:
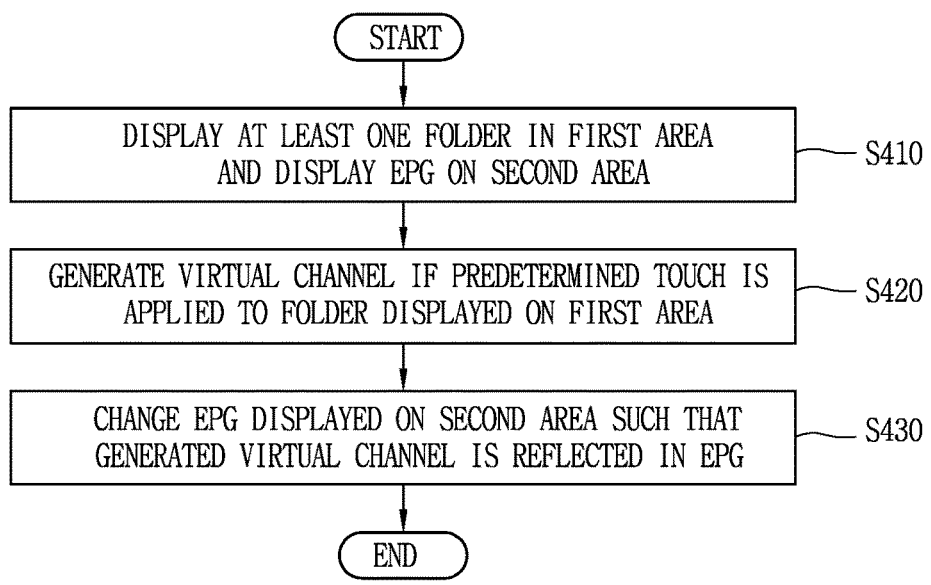
FIG. 4 is a flow chart illustrating a control method according to the present invention.

FIG. 4 is a flow chart illustrating a control method according to the present invention, and FIG. 5 is a conceptual view illustrating the control method of FIG. 4.

Referring to FIG. 4, first of all, in the present invention, the mobile terminal outputs at least one folder to a first area of the touch screen 151, and outputs EPG to a second area different from the first area (S410).

In more detail, the controller 180 of the mobile terminal 100 may output at least one folder to the first area of the touch screen 151 on the basis of a user request and control the touch screen 151 to output the EPG, which includes channel information related to the video output device that may perform wireless communication, to the second area different from the first area.

For example, as shown in (a) and (b) of FIG. 5, at least one folder 520 may be displayed on a first area 510a of output areas of the touch screen 151. Also, EPG 500, which includes channel information related to the video output device 200 that may perform wireless communication, may be displayed on a second area 510b different from the first area 510a. The EPG 500 may be referred to as EPG for the video output device 200, EPG of the video output device 200, or EPG related to the video output device 200. That is, the EPG may include channel information (for example, a channel number, a channel name, a name of a program (video) broadcasted through each channel, and start/end time of a program) related to channels that may be output from the video output device 200 connected to perform the wireless communication.

Afterwards, in the present invention, if a predetermined touch is applied to the folder displayed on the first area, a step of generating a virtual channel is performed (S420).

In more detail, if a predetermined touch is applied to any one of at least one folder displayed on the first area 510a, the controller 180 of the mobile terminal 100 may generate a virtual channel configured to output a video included in any one of the at least one folder from the video output device 200.

In this case, the predetermined touch is a touch for generating a virtual channel in which the video is reflected, to output the video included in the folder from the video output device 200, and may include various kinds of touches. For example, examples of the various kinds of touches may include a short (or tap) touch, a long touch, a double touch, a multi touch, a drag touch, a flick touch, a pinch-in touch, a pinch-out touch, a swype touch, and a hovering touch.

For example, the predetermined touch may be a long touch maintained for a certain time or more after a touch is applied to the touch screen 151. As shown in (a) of FIG. 5, if the long touch is applied to any one 520a of the at least one folder 520 displayed on the first area 510 of the touch screen 151, the controller 180 may generate a virtual channel in which videos A and B included in any one folder 520a (in this case, A means video A, and B means video B).

For another example, the predetermined touch may be a drag touch that starts from any one folder 520a included in the first area 510a and is released on the second area 510b different from the first area, as shown in (b) of FIG. 5.

In this case, the controller 180 may generate a virtual channel configured to output videos A and B included in the folder 520a to which the drag touch is applied, from the video output device 200, based on that the drag touch is applied.

However, it should be noted that the aforementioned various kinds of touches may equally/similarly be applied to the predetermined touch without limitation to the long touch or the drag touch, which is exemplarily described as above.

Afterwards, in the present invention, a step of changing the EPG displayed on the second area to reflect the generated virtual channel is performed (S430).

In more detail, if the virtual channel configured to output the video included in the any one folder from the video output device 200 is generated, the controller 180 may change (modify, reflect, apply) the EPG 500, whereby channel information corresponding to the virtual channel may be displayed on the EPG 500 displayed on the second area 510b.

For example, as shown in (c) of FIG. 5, channel information 530a corresponding to the virtual channel may include a channel number of the virtual channel, a name of the virtual channel, and information (a name set to the video, start/end time of the video, etc.) related to the video reflected in the virtual channel.

The video reflected in the virtual channel, as shown in (a) and (b) of FIG. 5, may include videos A and B included in any one folder 520a to which the predetermined touch is applied, among at least one folder displayed on the first area 510a.

The videos included in the folder may mean the videos stored in the memory 170, for example. In more detail, the memory 170 of the mobile terminal 100 according to the present invention may store at least one video therein.

At least one of the videos stored in the memory 170 may be included in the folder 520 output to the first area 510a. That is, the folder means software data (or file or structure) used to sort (manage) data stored in the memory 170. Also, the folder may be understood as an icon, a graphic object, image, etc., which is output to the touch screen 151 (since the description related to the folder corresponds to the apparent technology, its detailed description will be omitted).

The expression that the video is stored in the folder may mean that the videos stored in the memory 170 are sorted to be included in any one folder. That is, the expression that the video is stored in the folder may include that the video belongs to (is included in) any folder.

The controller 180 may generate a virtual channel to output the video included in the folder to which the above touch is applied, from the video output device 200 in accordance with the passage of time.

For example, if the video A and the video B are included in the folder 520a to which the touch is applied, the controller 180 may configure (generate) the virtual channel to output the video A and the video B from the video output device 200 sequentially in accordance with the passage of time. In other words, if a predetermined touch (for example, long touch or drag touch) is applied to the folder 520a in which the video A and the video B are included, the controller 180 may reflect the video A and the video B in the virtual channel (or previously generated virtual channel) to output the video A and the video B from the video output device 200 sequentially in accordance with the passage of time.

Through the aforementioned configuration, the present invention may provide a user interface that may generate a virtual channel more simply by using the folder output to the touch screen if the video, which may be output from the mobile terminal, is output in the form of folder.

Hereinafter, a method for generating a virtual channel by using the aforementioned folder will be described in more detail with reference to the accompanying drawings.

FIGS. 6*a*, 6*b*, 7*a*, 7*b*, 7*c*, 8*a* and 8*b* are conceptual views illustrating a method for generating a virtual channel according to the first embodiment of the present invention.

If a first folder of at least one folder displayed on a first area is selected (if a predetermined touch is applied), the controller 180 may generate a virtual channel in which videos included in the first folder are reflected. Also, in a state that the virtual channel is previously generated (if channel information corresponding to the virtual channel is reflected in EPG), if the first folder is selected, the controller 180 may reflect the videos included in the first folder in the previously generated virtual channel to output the videos included in the first folder from the video output device 200 sequentially in accordance with the passage of time.

Also, if a second folder different from the first folder is selected from at least one folder displayed on the first area, the controller 180 may generate a virtual channel in which videos included in the second folder are reflected. Likewise, in a state that the virtual channel is previously generated, if the second folder is selected, the controller 180 may reflect the videos included in the second folder in the previously generated virtual channel to output the videos included in the second folder from the video output device 200 sequentially in accordance with the passage of time.

Figure 6A:
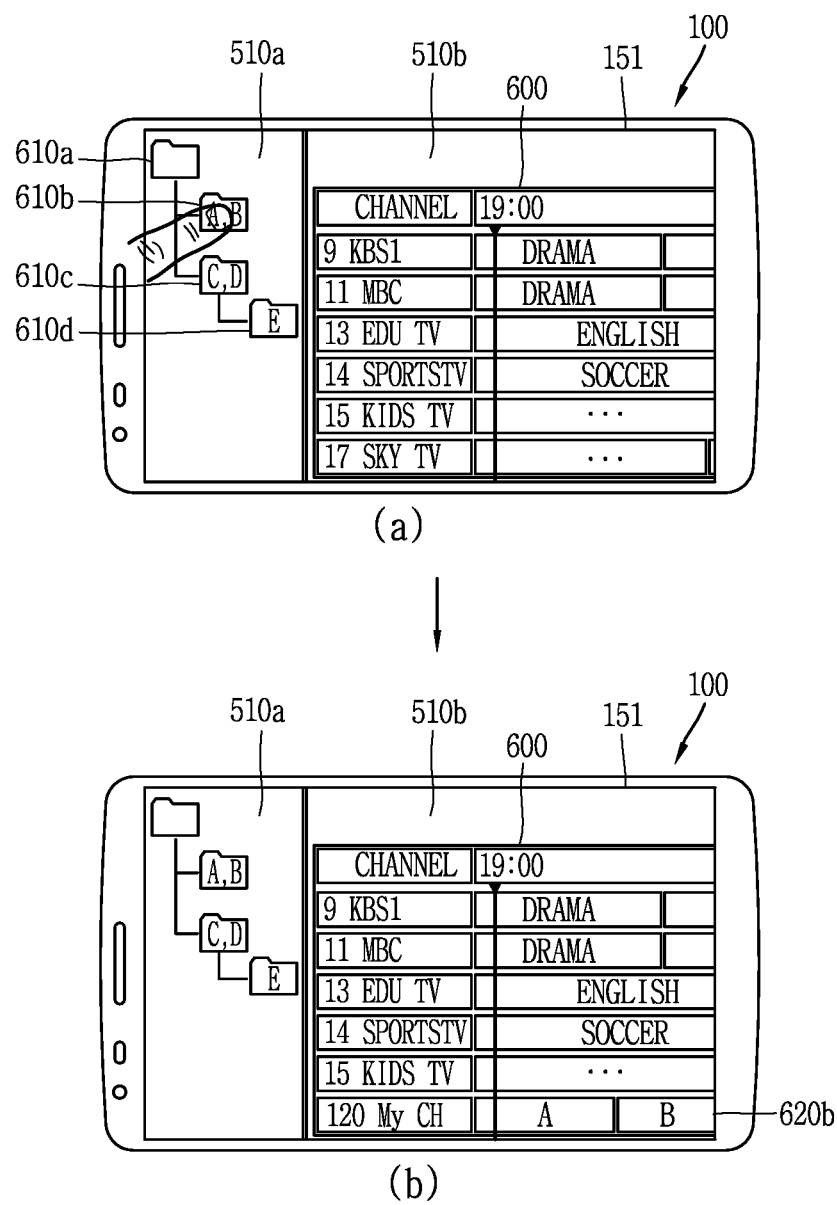
FIGS. 6a, 6b, 7a, 7b, 7c, 8a and 8b are conceptual views illustrating a method for generating a virtual channel according to the first embodiment of the present invention.

For example, as shown in (a) of FIG. 6*a*, if a first one 610*b* of at least one folder 610*a* to 610*d* displayed on a first area 510*a* is selected, the controller 180 may generate a virtual channel in which videos (video A and video B) included in the first folder 610*b* are reflected, to output the videos (video A and video B) from the video output device 200 sequentially in accordance with the passage of time.

As shown in (b) of FIG. 6*a*, the controller 180 may change EPG 600 displayed on a second area 510*b* to display (reflect) channel information 620*b* corresponding to the virtual channel in which videos (video A and video B) included in the first folder 610*b* are reflected, on the EPG 600. That is, the controller 180 may reflect the channel information 620*b* corresponding to the virtual channel, which is configured to output the videos included in the first folder 610*b* from the video output device 200 in accordance with the passage of time, in the EPG 600 displayed on the second area 510*b*.

Figure 6B:
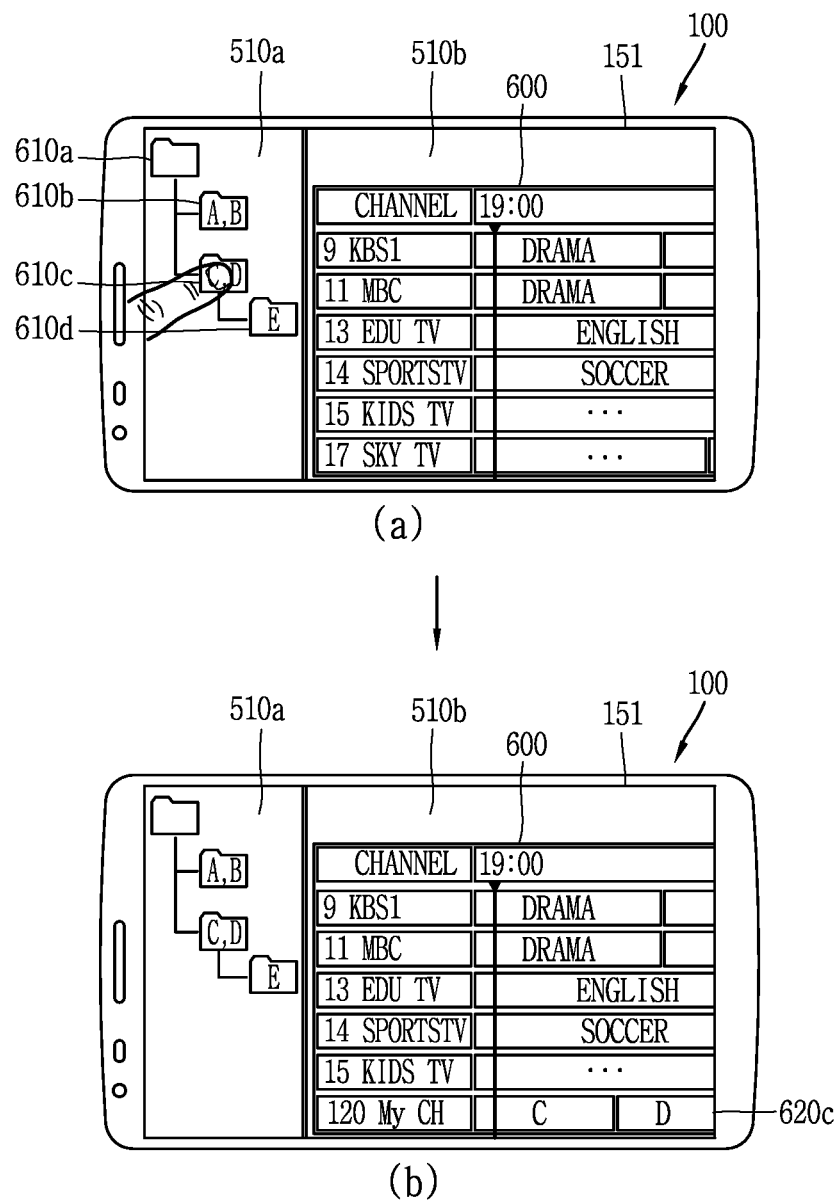

For another example, as shown in (a) of FIG. 6*b*, if a second folder 610*c* different from the first folder 610*b* is selected from at least one folder 610*a* to 610*d* displayed on the first area 510*a*, the controller 180, as shown in (b) of FIG. 6*b*, may generate a virtual channel in which videos (video C and video D) included in the second folder 610*c* are reflected, to output the videos (video C and video D) from the video output device 200 sequentially in accordance with the passage of time.

As shown in (b) of FIG. 6*b*, the controller 180 may change EPG 600 displayed on the second area 510*b* to display channel information 620*c* corresponding to the virtual channel in which videos (video C and video D) included in the second folder 610*c* are reflected, on the EPG 600. That is, the controller 180 may reflect the channel information 620*c* corresponding to the virtual channel, which is configured to output the videos included in the second folder 610*c* from the video output device 200 in accordance with the passage of time, in the EPG 600 displayed on the second area 510*b*.

Meanwhile, a higher or lower concept may be applied to the at least one folder displayed on the first area of the touch screen 151. In more detail, the first folder and the second folder which belongs to the first folder may be displayed on the first area 510*a*.

Figure 7A:
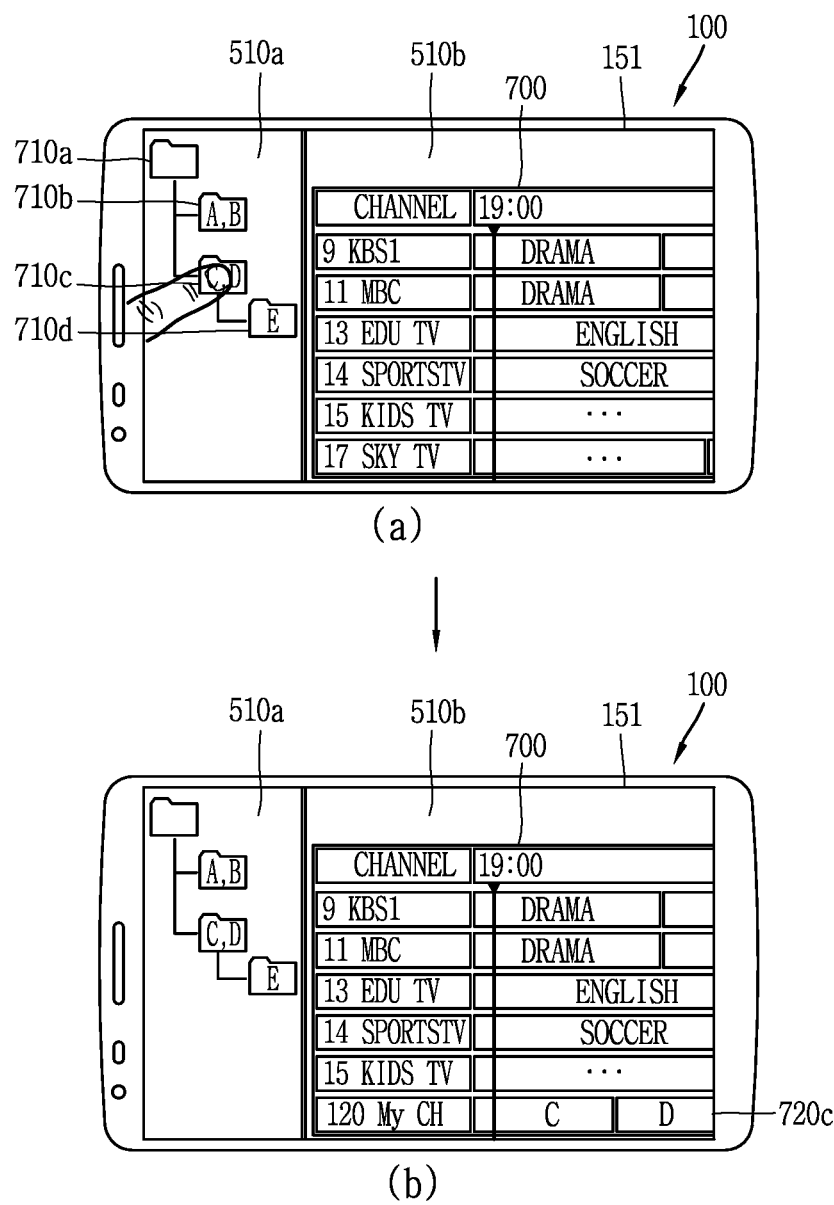

For example, referring to (a) of FIG. 7*a*, at least one folder 710*a* to 710*d* may be displayed on the first area 510*a* of the touch screen 151.

At this time, if the first folder is a folder corresponding to 710*a*, the second folders which belong to the first folder may be folders corresponding to 710*b*, 710*c* and 710*d*. Also, if the first folder is a folder corresponding to 710*c*, the second folder which belongs to the first folder may be a folder corresponding to 710*d*.

The second folder which belongs to the first folder may mean the second folder which exists within the first folder. In this case, the second folder which belongs to the first folder may mean the second folder included in the first folder. The first folder may be a higher folder of the second folder. Also, the second folder may be a lower folder of the first folder.

The controller 180 may generate a virtual channel (or reflect a virtual channel in a previously generated virtual channel) in different manners depending on a type of a predetermined touch applied to the first folder that includes the second folder.

In more detail, if a first touch is applied to the first folder, the controller 180 may generate a virtual channel in which videos included in the first folder are reflected. Also, if a second touch different from the first touch is applied to the first folder, the controller 180 may generate a virtual channel in which videos included in the first folder and the second folder are all reflected.

For example, as shown in (a) of FIG. 7*a*, if a first touch (for example, long touch) is applied to a first folder 710*c* that includes a second folder 710*d* displayed on the first area 510*a*, the controller 180 may generate a virtual channel in which videos (video C and video D) included in the first folder 710*c* are reflected as shown in (b) of FIG. 7*a*.

The controller, as shown in (b) of FIG. 7*a*, may change EPG 700 displayed on the second area 510*b* to display channel information 720*c* corresponding to the virtual channel in which the videos (video C and video D) included in the first folder 710*c* are reflected, on the EPG 700. That is, the controller 180 may reflect the channel information 720*c* corresponding to the virtual channel, which is configured to output only the videos included in the first folder 710*c* from the video output device 200 in accordance with the passage of time, in the EPG 700 displayed on the second area 510*b*.

Figure 7B:
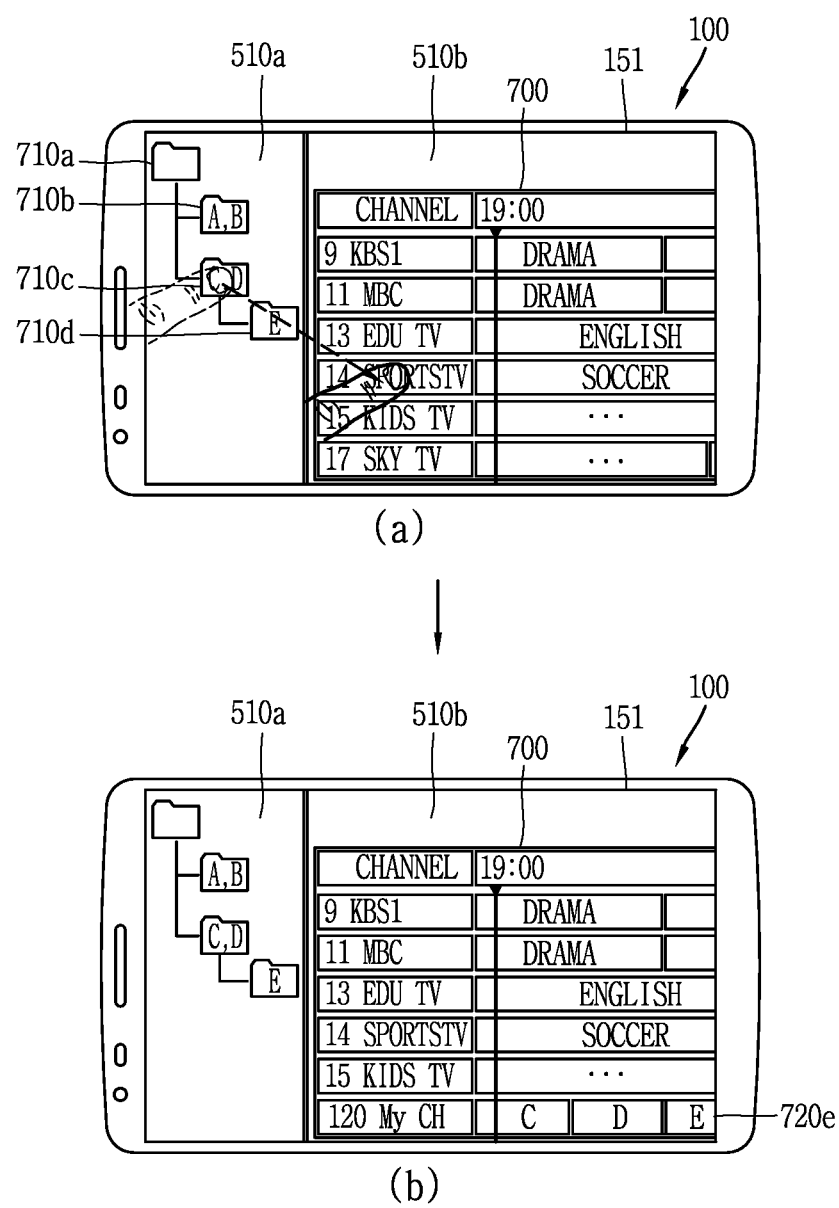

For another example, as shown in (a) of FIG. 7*b*, if a second touch (for example, drag touch) different from the first touch is applied to the first folder 710*c* that includes the second folder 710*d* displayed on the first area 510*a*, the controller 180 may generate a virtual channel in which all of the videos (video C, video D and video E) included in the first folder 710*c* and the second folder 710*d* are reflected, as shown in (b) of FIG. 7*b*.

As shown in (b) of FIG. 7*b*, the controller 180 may change the EPG 700 displayed on the second area 510*b* to display channel information 720*e* corresponding to the virtual channel in which the videos (video C, video D and video E) included in the first and second folders 710*c* and 710*d* are reflected, on the EPG 700. That is, the controller 180 may reflect the channel information 720e corresponding to the virtual channel, which is configured to output all the videos (video C and video D stored in the first folder and video E stored in the second folder included in the first folder) included in the first and second folders 710c and 710d from the video output device 200 in accordance with the passage of time, in the EPG 700 displayed on the second area 510b.

Figure 7C:
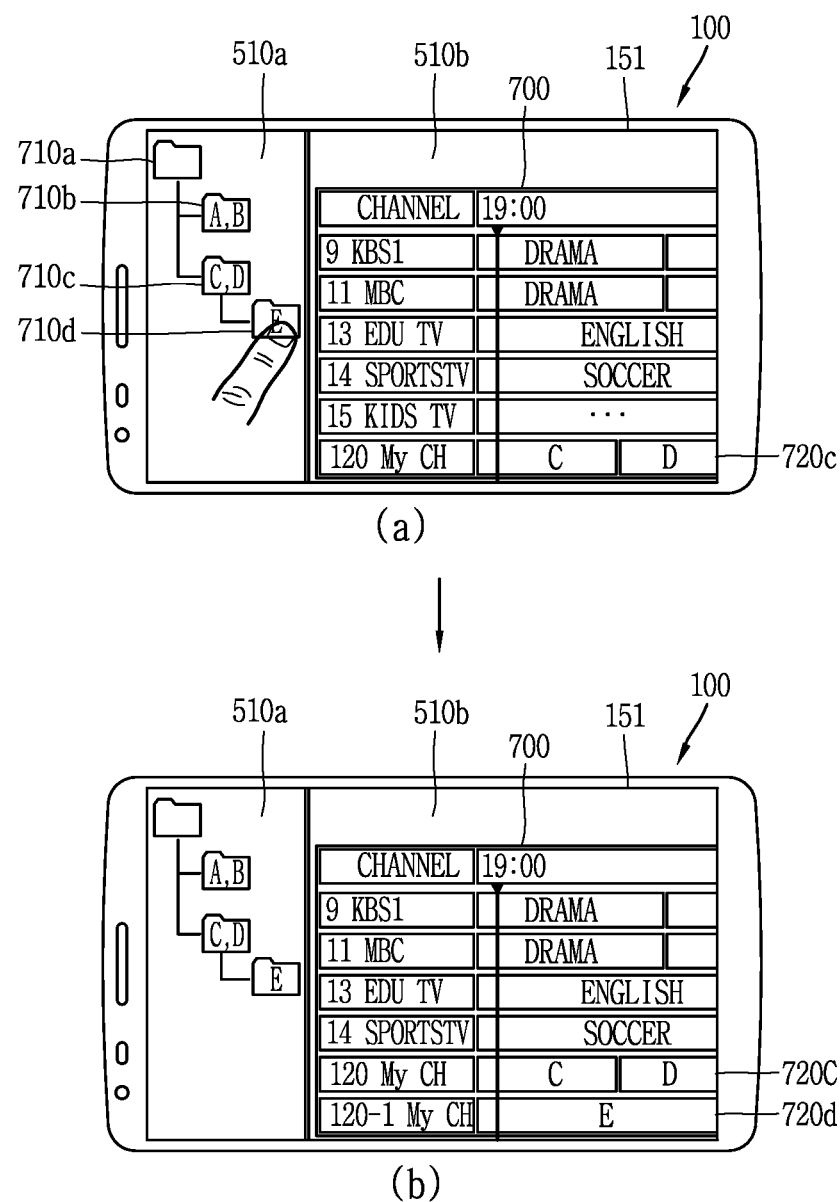

Meanwhile, as shown in (a) of FIG. 7c, in a state that the channel information 720c corresponding to the virtual channel in which the videos (video C and video D) included in the first folder 710c displayed on the first area 510a are reflected is reflected in the EPG 700 displayed on the second area 510b, a predetermined touch may be applied to the second folder 710d which belongs to the first folder 710c. In this case, as shown in (b) of FIG. 7c, the controller 180 may generate a new virtual channel in which the video E included second folder 710d is reflected, on the basis of the predetermined touch applied to the second folder 710d.

The controller 180 may change the EPG 700 to reflect channel information 720d corresponding to the new virtual channel in the EPG 700 displayed on the second area 510b.

In this case, the new virtual channel (virtual channel in which the videos included in the second folder are reflected) may be set to a lower channel of the previously generated virtual channel (virtual channel in which the videos included in the first folder are reflected). In other words, a channel number of the new virtual channel may be generated as a lower number of the channel number of the previously generated virtual channel.

For example, if the channel number of the previously generated virtual channel is 120, the channel number of the new virtual channel may be 120-1 or 121 which is a lower number of 120.

Meanwhile, in a state that the channel information corresponding to the virtual channel in which the videos included in the first folder 710c are included is output to the EPG 700, the controller 180 may reflect the videos included in the second folder in the virtual channel in accordance with a touch mode different from the touch mode applied to the second folder 710d which belongs to the first folder 710c.

For example, if the first touch is applied to the second folder 710d, the controller 180 may generate a new virtual channel in which the video E included in the second folder 710d is reflected.

For another example, if the second touch different from the first touch is applied to the second folder 710d, the controller 180 may reflect the video E included in the second folder in the previously generated virtual channel (for example, the virtual channel in which the video included in the first folder is reflected). In this case, the new virtual channel in which the video E included in the second folder is only reflected may not be generated.

Meanwhile, if a predetermined touch is applied to a folder where a lower folder of at least one folder displayed on the first area 510a of the touch screen 151 exists, the controller 180 may generate a plurality of virtual channels. The controller 180 may display channel information corresponding to the generated plurality of virtual channels by reflecting the corresponding channel information in the EPG displayed on the second area 510b of the touch screen 151.

Figure 8A:
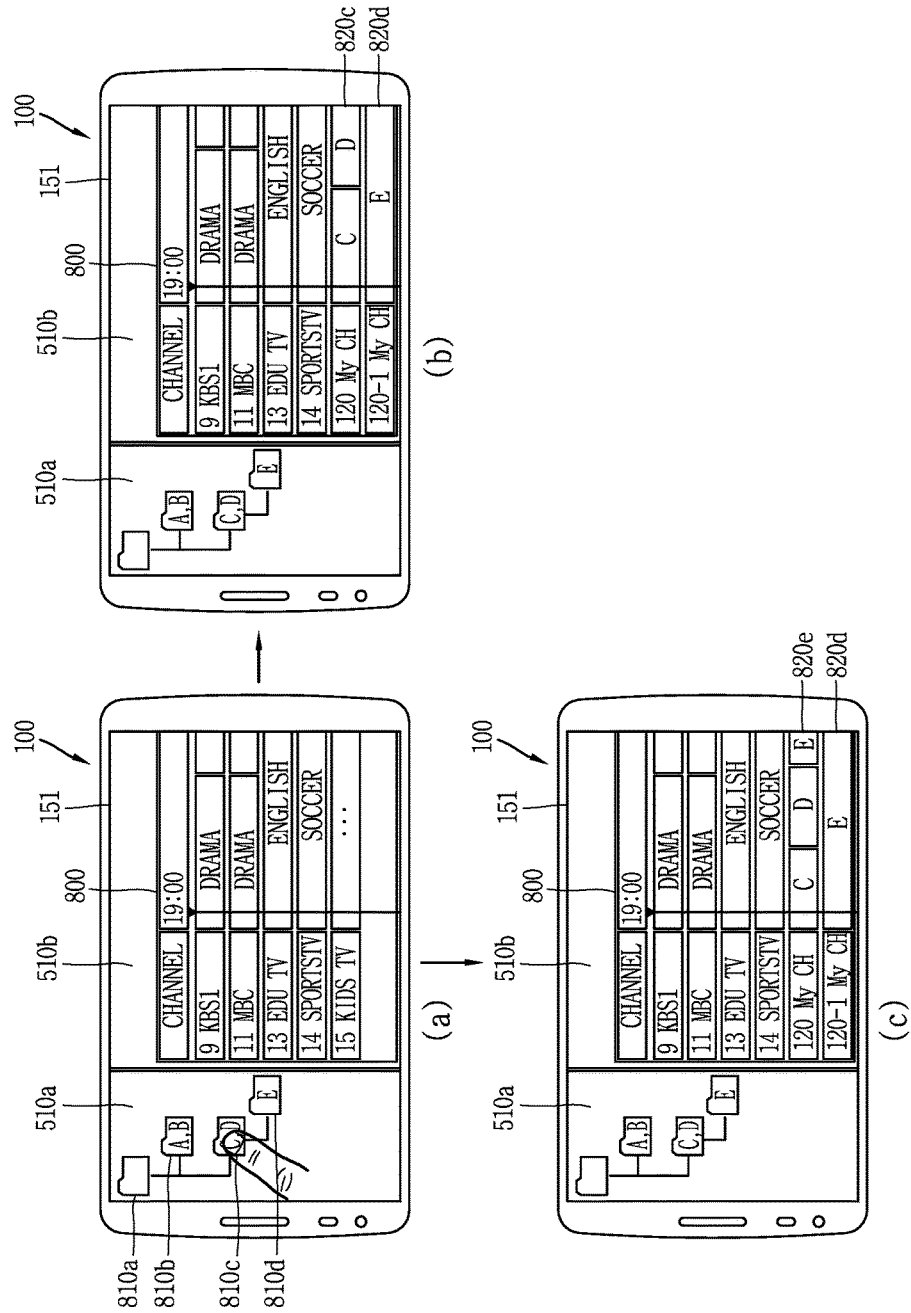

For example, as shown in (a) of FIG. 8a, if a lower folder 810d exists in a folder 810c to which the predetermined touch is applied, the controller 180 may generate a plurality of virtual channels. Afterwards, as shown in (b) of FIG. 8a, the controller 180 may change EPG 800 displayed on the second area 510b to reflect channel information 820c and 820d corresponding to the plurality of virtual channels in the EPG 800.

At this time, videos (video C and video D) included in the folder 810c to which the touch is applied may be reflected in the first one of the plurality of virtual channels, and a video E included in the lower folder 810d may be reflected in the second one of the plurality of virtual channels, which is different from the first virtual channel.

The second virtual channel may be set to a lower channel of the first virtual channel. For example, if a channel number of the first virtual channel is 120, a channel number of the second virtual channel may be 120-1. Also, if there is a request for release (deletion) of the first virtual channel, the second virtual channel which is a lower channel of the first virtual channel may be released together with the first virtual channel on the basis of the request for release. However, without limitation to this case, if there is a request for release (deletion) of the first virtual channel, the first virtual channel may be deleted, and the channel number of the second virtual channel may be changed to the channel number of the first virtual channel.

As shown in (b) of FIG. 8a, information related to the videos (video C and video D) included in the folder 810c to which a touch is applied may be included (displayed) in the channel information 820c corresponding to the first virtual channel reflected in the EPG 800, and information related to the video E included in the lower folder 810d may be included in the channel information 820d corresponding to the second virtual channel reflected in the EPG 800.

For another example, if a predetermined touch is applied to the folder 810c that includes the lower folder 810d, the controller 180 may generate a plurality of virtual channels. At this time, as shown in (c) of FIG. 8a, all of the videos (video C, video D and video E) included in the folder 810c and the lower folder 810d may be reflected in the first one of the plurality of virtual channels.

In this case, as shown in (c) of FIG. 8a, information related to the videos (video C, video D and video E) included in the lower folder 810d which belongs to the folder 810c to which a touch is applied may be included in channel information 820e corresponding to the first virtual channel reflected in the EPG 800.

The controller 180 may determine whether to reflect only the videos (video C and video D) included in the folder 810c to which the touch is applied in the first virtual channel as shown in (b) of FIG. 8a or whether to reflect all of the videos (video C, video D and video E) included in the folder 810c and the lower folder 810d in the first virtual channel as shown in (c) of FIG. 8a, on the basis of the touch mode applied to the folder 810c that includes the lower folder 810d.

For example, if the first touch (for example, long touch) is applied to the folder 810c, the controller 180 may reflect only the videos (video C and video D) included in the folder 810c in the first virtual channel. For another example, if the second touch (for example, drag touch) different from the first touch is applied to the folder 810c, the controller 180 may reflect all of the videos (video C, video D and video E) included in the folder 810c and the lower folder 810d in the first virtual channel.

Meanwhile, the controller 180 may display channel information corresponding to the virtual channel, in which the videos included in the folder displayed on the first area 510a are reflected, by reflecting the channel information in the EPG 800 displayed on the second area 510b of the touch screen 151 on the basis of a predetermined touch applied to the corresponding folder. That is, in a state that the channel information corresponding to the virtual channel is reflected in the EPG, if the predetermined touch is applied to the higher folder of the folder to which the touch is applied, the controller 180 may generate a new virtual channel in which the video included in the higher folder is reflected. Also, the controller 180 may change the EPG 800 displayed on the second area 510*b* such that channel information corresponding to the new virtual channel may be reflected in the EPG 800.

At this time, the channel number of the virtual channel may be changed based on that the new virtual channel is generated.

In more detail, in a state that the channel number of the virtual channel is set to a second channel number, if the new virtual channel is generated, the controller 180 may set the channel number of the new virtual channel to a first channel number and change the channel number of the virtual channel from the first channel number to the second channel number different from the first channel number.

At this time, the new virtual channel may be the higher channel of the virtual channel. Therefore, the second channel number may be a lower number of the first channel number. For example, if the first channel number is 120, the second channel number may be 120-1.

Figure 8B:
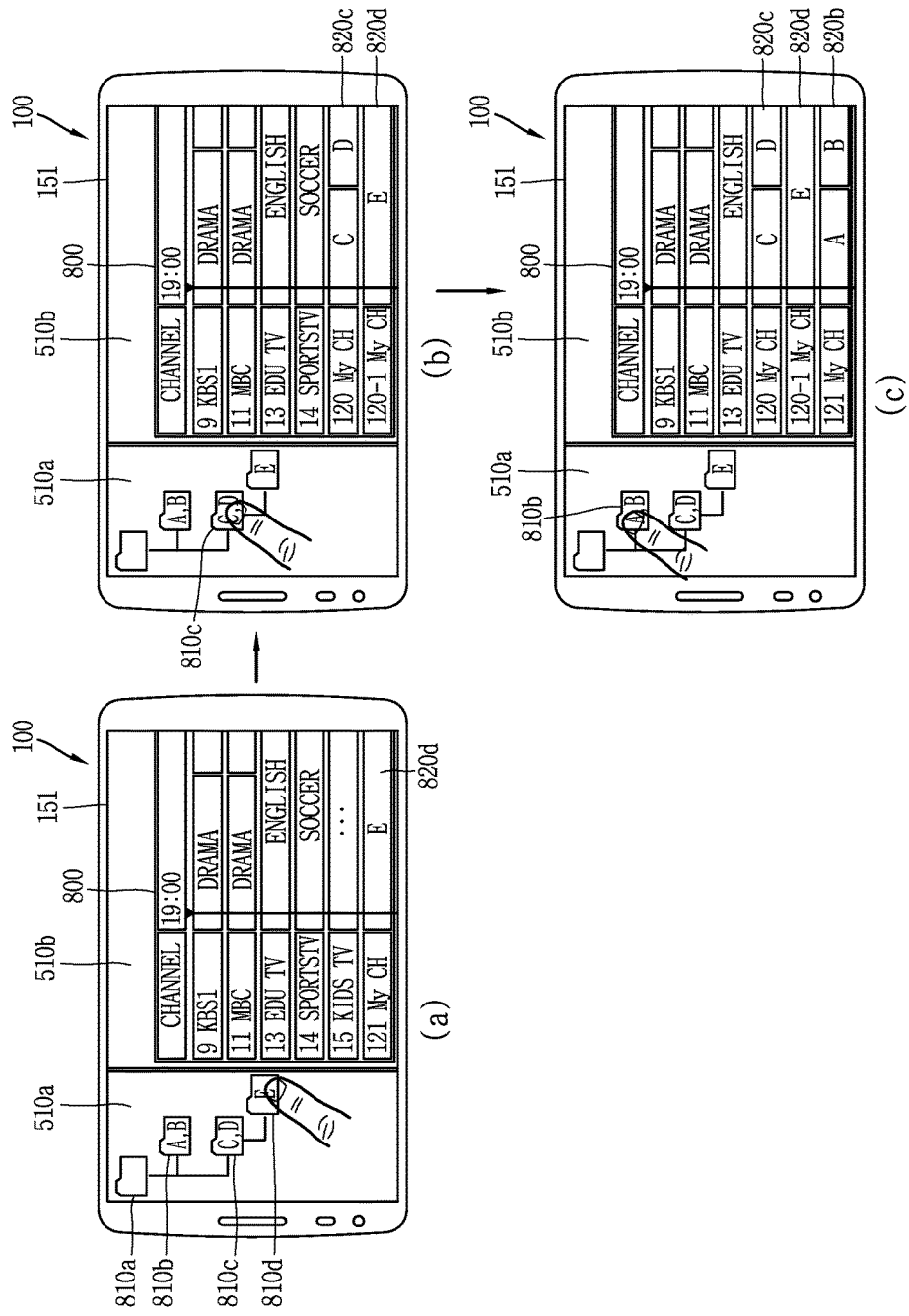

For example, as shown in (a) of FIG. 8*b*, if any one 810*d* of at least one folder displayed on the first area 510*a* is selected (if a predetermined touch is applied), the controller 180 may generate a virtual channel in which video E included in the selected folder 810*d* is reflected. Afterwards, the controller 180 may display channel information 820*d* corresponding to the generated virtual channel by reflecting the corresponding channel information in the EPG 800 displayed on the second area 510*d*. At this time, a channel number of the channel information 820*d* may be a first channel number (for example, 120).

In a state that the channel information 820*d* corresponding to the virtual channel is reflected in the EPG 800, as shown in (b) of FIG. 8*b*, if a predetermined touch is applied to the higher folder 810*c* of the selected folder 810*d*, the controller 180 may generate a new virtual channel in which videos (video C and video D) (or videos (video C, video D and video E) included in the higher folder 810*c* and the folder 180*d*) included in the higher folder 810*c* are reflected.

The controller 180 may change the EPG 800 displayed on the second area 510*b* as shown in (b) of FIG. 8*b* such that channel information 820*c* corresponding to the new virtual channel may be reflected in the EPG 800.

At this time, referring to (a) and (b) of FIG. 8*b*, the channel number of the virtual channel 820*d* previously displayed on the EPG may be changed based on that the new virtual channel 820*c* is generated.

In a state that the channel number of the virtual channel 820*d* is the first channel number (no. 120), if a new virtual channel is generated (if a new virtual channel in which videos included in the higher folder are reflected is generated), the controller 180 may set a channel number of the new virtual channel to the first channel number (no. 120). Also, the controller 180 may change the channel number of the virtual channel 820*d* from the first channel number (no. 120) to the second channel number (no. 120-1) which is a lower number of the first channel number.

Meanwhile, as shown in (c) of FIG. 8*b*, in a state that the virtual channel in which the video included in the higher folder 810*c* is reflected is generated, if the predetermined touch is applied to the folder 810*b* different from the higher folder 810*c*, the controller 180 may generate a virtual channel in which the video included in the folder 810*b* is reflected. At this time, the channel information 820*b* corresponding to the generated virtual channel may be reflected in and displayed on the EPG 800. The folder 810*b* may be a folder having the same layer as that of the higher folder 810*c*.

The channel number of the generated virtual channel may be generated as a channel number (no. 121) different from the channel number (no. 120) of the virtual channel in which the video included in the higher folder 810*c* is reflected. This is because that the generated virtual channel is a virtual channel having the same layer as that of the virtual channel in which the video included in the higher folder 810*c* is reflected.

Meanwhile, it has been described that the controller 180 generates a virtual channel based on that a predetermined touch is applied to a folder. However, without limitation to this case, a graphic object (or icon, button, image, etc.) associated with a function of generating a virtual channel may be displayed on the touch screen 151. If the graphic object is selected, the controller 180 may generate a virtual channel. At this time, no video may be reflected in the virtual channel.

In a state that the virtual channel is generated, if a predetermined touch is applied to a folder displayed on a first area, the controller 180 may reflect a video included in the touched folder in the generated virtual channel. The description made with reference to FIGS. 4 to 8*b* may equally/similarly be applied to this case. That is, the description that 'the virtual channel in which the video included in the touched folder is reflected is generated based on that the predetermined touch is applied to the folder' may equally/similarly be applied to the description that 'if a predetermined touch is applied to a folder, a video included in the touched folder is reflected in a previously generated virtual channel'.

As described above, the present invention may provide a user interface that may generate a virtual channel in an optimized manner by using a folder if a video that may be output from a mobile terminal is included in the folder.

Meanwhile, a thumbnail corresponding to a video that may be output from the mobile terminal not the folder may be displayed on the first area 510*a* of the touch screen 151. Hereinafter, a method for generating a virtual channel by using the thumbnail will be described with reference to the accompanying drawings.

FIGS. 9*a*, 9*b* and 9*c* are conceptual views illustrating a method for generating a virtual channel according to the second embodiment of the present invention.

As shown in (a) of FIG. 9*a*, a thumbnail 910 corresponding to a video that may be output from the mobile terminal may be displayed on the first area 510*a* of the touch screen 151. If the video that may be output from the mobile terminal is a still video, the thumbnail 910 may be an image displayed by downsizing the still image. If the video that may be output from the mobile terminal is a moving video, the thumbnail 910 may be any one (main still video) of a plurality of still videos (frame) constituting the moving video.

Also, the video that may be output from the mobile terminal may be a video stored in the memory 170, or may be a video that may be received from an external server (or Internet).

Also, as shown in (a) of FIG. 9*a*, a graphic object 902 associated with a function of generating a virtual channel may be displayed on the touch screen 151. The controller 180 may generate a virtual channel as shown in (b) of FIG.

9a on the basis of a user request. At this time, no video may be reflected in the virtual channel.

The user request may be at least one of a predetermined touch (for example, short touch, long touch or drag touch) applied to the thumbnail 910 and a touch applied to the graphic object 902 associated with a function of generating a virtual channel.

That is, the virtual channel may be generated based on at least one of the predetermined touch applied to the thumbnail 910 and the touch applied to the graphic object 902.

The controller 180 may display channel information 920 corresponding to the generated virtual channel by reflecting the channel information 920 in EPG 900 displayed on the second area 510b.

In this state, as shown in (b) of FIG. 9a, if a predetermined touch (for example, short touch, long touch or drag touch) is applied to any one 910f of thumbnails displayed on the first area 510a, the controller 180 may change the EPG 900 displayed on the second area 510b such that a video corresponding to the thumbnail 910f may be reflected in the generated virtual channel, as shown in (c) of FIG. 9a.

In more detail, as shown in (b) of FIG. 9a, in a state that the channel information 920 corresponding to the virtual channel in which no video is reflected is displayed on the EPG 900, if a predetermined touch is applied to any one 910f of the thumbnails displayed on the first area 510a, the controller 180 may reflect the video corresponding to the any one the thumbnail 910f in the virtual channel. At this time, information related to the video corresponding to the any one thumbnail 910f may be displayed by being reflected in the channel information 920 corresponding to the virtual channel.

Meanwhile, the controller 180 may perform different operations based on that different touches are applied to the thumbnails displayed on the first area 510a.

In more detail, if a first touch is applied to the thumbnail, the controller 180 may reflect the video corresponding to the thumbnail in the generated virtual channel, and if a second touch different from the first touch is applied to the thumbnail, the controller 180 may select the thumbnail.

In a state that a plurality of thumbnails displayed on the first area 510a of the touch screen 151 are selected, if a predetermined touch is applied to any one of the plurality of thumbnails, the controller 180 may reflect a plurality of videos corresponding to the plurality of thumbnails in the generated virtual channel.

At this time, the playing order of the plurality of videos reflected in the virtual channel may be determined on the basis of the selected order of the plurality of thumbnails.

For example, as shown in (a) of FIG. 9b, if a first touch (for example, short touch or drag touch) is applied to a thumbnail 910c displayed on the first area 510a of the touch screen 151, the controller 180 may reflect a video (video C) corresponding to the touched thumbnail 910c in the virtual channel as shown in (b) of FIG. 9b. At this time, as shown in (b) of FIG. 9b, information related to the video C corresponding to the touched thumbnail 910c may be displayed by being reflected in channel information 920c corresponding to the virtual channel.

For another example, as shown in (a) of FIG. 9c, if a second touch (for example, long touch) different from the first touch is applied to the first thumbnail 910c displayed on the first area 510a of the touch screen 151, the controller 180 may select the first thumbnail 910c as shown in (b) of FIG. 9c. Likewise, as shown in (b) of FIG. 9c, in a state that the first thumbnail 910c is selected, if the second touch is applied to a second thumbnail 910b different from the first thumbnail 910c, the controller 180 may select the second thumbnail 910b.

In a state that the plurality of thumbnails 910c and 910b are selected, as shown in (c) of FIG. 9c, if a predetermined touch (for example, drag touch) is applied to any one of the plurality of thumbnails 910c and 910b, the controller 180 may reflect a plurality of videos (video C and video B) corresponding to the plurality of thumbnails 910c and 910b in a previously generated virtual channel as shown in (d) of FIG. 9c. At this time, the playing order of the plurality of videos (video C and video B) may be determined on the basis of the selected order of the plurality of thumbnails 910c and 910b.

For example, referring to FIG. 9c, since the second thumbnail 910b corresponding to the video B has been selected after the first thumbnail 910c corresponding to the video C has been selected, the playing order of the plurality of videos (video C and video B) may be determined such that the video C is prior to the video B.

At this time, channel information 920e in which information related to the plurality of videos (video C and video B) is reflected in channel information 920 corresponding to a virtual channel may be displayed on the EPG 900 displayed on the second area 510b of the touch screen 151.

In this case, an indicator 960 indicating that a video corresponding to a corresponding thumbnail has been reflected in the virtual channel may be displayed on the thumbnails 910b and 910c selected from the thumbnail 910 displayed on the first area 510a. The indicator 960 may be implemented in the form of a number indicating a playing order. Also, the indicator 960 may disappear from a corresponding thumbnail if a video corresponding to the corresponding thumbnail is completely played by the video output device 200.

However, without limitation to this case, the controller 180 may determine an output order of the plurality of videos corresponding to the plurality of thumbnails regardless of the selected order of the plurality of thumbnails.

Through the aforementioned configuration, the present invention may provide a user interface that may output videos corresponding to a plurality of thumbnails from the video output device 200 sequentially in accordance with the passage of time on the basis of a selected order of the plurality of thumbnails when a user desires to output the plurality of videos from the video output device sequentially in accordance with the passage of time without a separate touch.

Meanwhile, the present invention may provide a user interface that may output information related to an event from the video output device if the event occurs while videos that may be output from the mobile terminal are being output from the video output device sequentially in accordance with the passage of time by using a virtual channel.

Figure 10:
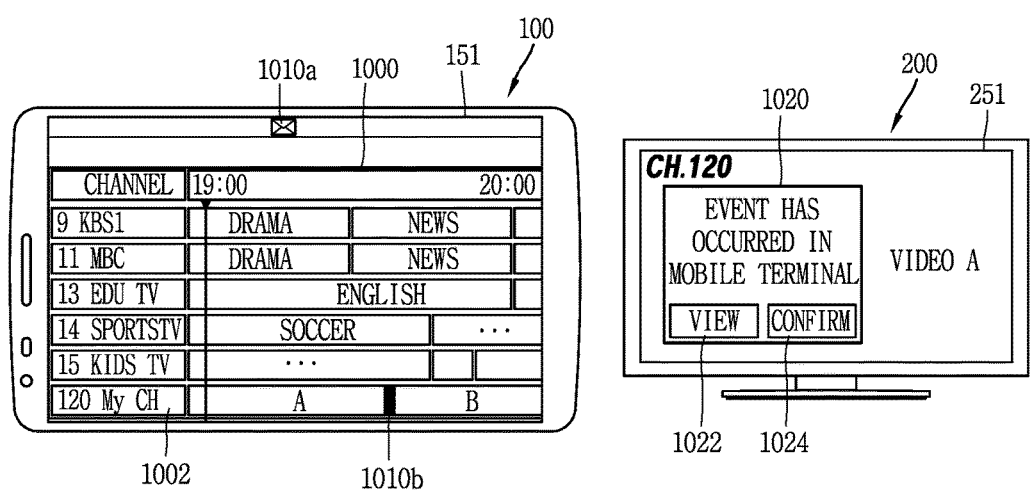
FIG. 10 is a conceptual view illustrating a method for reflecting information corresponding to an event in an EPG if the event occurs in a mobile terminal according to the present invention.

FIG. 10 is a conceptual view illustrating a method for reflecting information corresponding to an event in an EPG if the event occurs in a mobile terminal according to the present invention.

If an event occurs in a state that a video, which may be output from the mobile terminal, is being output from the video output device 200 through a virtual channel, the controller 180 may reflect information corresponding to the event in the virtual channel, such that the information corresponding to the event may be output from the video output device 200.

The event may include a push message of an application, a text message, a messenger, a phone, etc.

For example, as shown in (a) of FIG. 10, if an event occurs in the mobile terminal 100, an icon 1010a indicating that the event has occurred may be displayed on the touch screen 51.

Also, the controller 180 may reflect the information corresponding to the event in the virtual channel, such that the information corresponding to the event may be output from the video output device 200. In this case, an indicator 1010b indicating that the information corresponding to the event has been reflected in the virtual channel may be displayed on channel information corresponding to the virtual channel of EPG 1000 displayed on the touch screen 151. For example, the information corresponding to the event may include event contents (push message content, text message content, messenger content, etc.).

For example, the information corresponding to the event may be output after the video which is currently output is completely output. This is to allow a user to view the video, which is currently output, without any interruption.

However, without limitation to the above example, the information corresponding to the event may be configured to be output together with the video which is currently output after a predetermined time from the current time, or may be configured to be output directly based on that the information corresponding to the event is transmitted to the video output device 200.

Meanwhile, if the event occurs in the mobile terminal while the video reflected in the virtual channel is being output from the video output device 200, a notification window 1020 indicating that the event has occurred may be output to the display unit of the video output device 200.

A button 1022 outputting the information corresponding to the event and a button 1024 (for example, confirmation button), which allows the notification window 1020 to disappear from the video output device 200, may be associated with the notification window 1020.

If the button 1022 outputting information corresponding to the event is selected through an external input device (for example, remote controller or mobile terminal), a controller 280 of the video output device 200 may receive the information corresponding to the event from the mobile terminal 100 and output the information corresponding to the event to the display unit 251 of the video output device 200. At this time, the information corresponding to the event may be output by being superimposed on at least a part of the video which is currently output.

Also, if the button 1022 outputting information corresponding to the event is selected, the controller 180 of the mobile terminal 100 (or controller 280 of the video output device 200) may release a setup of the information corresponding to the event, which is reflected in the virtual channel. This is because that the information corresponding to the event has been confirmed by the user.

Meanwhile, if the confirmation button 1024 is selected through the external input device, the controller 280 of the video output device 200 may allow the notification window 1020 to disappear from the display unit 251.

In this case, the information corresponding to the event reflected in the virtual channel may be maintained. Also, if the current time reaches an output time of the information corresponding to the event reflected in the virtual channel, the information corresponding to the event may be output to the display unit 251 of the video output device 200.

Through the aforementioned configuration, the present invention may provide a control method for outputting information (information corresponding to the event) related to the event occurring in the mobile terminal without a separate touch in accordance with the passage of time.

In the present invention, various kinds of controls may be performed using an EPG. Hereinafter, a control method according to one embodiment, which is performed through the EPG, will be described with reference to the accompanying drawing.

FIG. 11 is a conceptual view illustrating a method for changing a setup screen output from a mobile terminal by using an EPG in a video output device according to the present invention.

As described above, the EPG 1100 related to the video output device 200 may be output to the video output device 200. Channel information 1110 corresponding to a virtual channel generated in the mobile terminal 100 may be displayed on the EPG 1100. The controller 280 of the video output device 200 may output a video reflected in the virtual channel from the display unit 251 of the video output device 200.

Also, a button 1120 associated with a function of reflecting screen information displayed on the mobile terminal 100, which performs wireless communication (or transmits a video through a virtual channel), in the EPG 1100 may be displayed on the display unit 251 of the video output device 200.

If the button 1120 is selected through an external input device (for example, remote controller), the controller 280 of the video output device 200 may reflect screen information displayed on the touch screen 151 of the mobile terminal 100, which performs wireless communication, in the EPG 1100 displayed on the display unit 251.

For example, as shown in (a) of FIG. 11, if the screen information output to the touch screen 151 of the mobile terminal 100 is a setup screen 1200, a plurality of higher menus 1210 and a lower menu 1220, which belongs to any one of the plurality of higher menus 1210, may be displayed on the setup screen 1200.

If the button 1120 is selected, the controller 280 of the video output device 200 may display at least one of the setup screen output to the touch screen 151 of the mobile terminal, the higher menu, and the lower menu by reflecting the at least one in the EPG 1100.

For example, as shown in (b) of FIG. 11, a graphic object 1132 corresponding to the screen information output to the touch screen 151 of the mobile terminal 100 and graphic objects 1134a, 1134b and 1134c corresponding to the higher menus included in the screen information may be displayed on the EPG 1100.

The graphic objects may be displayed in the form of channel information 1130 as shown in (b) of FIG. 11.

If any one 1134a of the graphic objects displayed on the EPG 1100 is selected, the controller 280 of the video output device 200 may receive information related to the lower menu which belongs to the higher menu corresponding to the selected graphic object from the mobile terminal 100.

Afterwards, the controller 280 of the video output device 200 may display channel information 1140 included in the graphic objects corresponding to the lower menu by reflecting the channel information 1140 in the EPG 1100 on the basis of the information related to the lower menu, as shown in (c) of FIG. 11.

If any one 1140a of the graphic objects corresponding to the lower menu is selected, the controller 280 of the video output device 200 may divide the display unit 251 into first and second areas 1150a and 1150b, output a running screen 1160a of the menu corresponding to the selected graphic object to the first area 1150a and output the EPG 1100 to the second area 1150b.

If a specific function is selected through the running screen 1160a, the controller 280 of the video output device 200 may transmit information related to the selected specific function to the mobile terminal through the wireless communication unit. In this case, the controller 180 of the mobile terminal 100 may drive the specific function on the mobile terminal based on that the information related to the specific function is received.

Through the aforementioned configuration, the present invention may provide a user interface that may control the mobile terminal by using the EPG output to the video output device in a state that the video, which may be output from the mobile terminal, is output through the video output device 200.

Meanwhile, in the present invention, if the video is reflected in the virtual channel, the output time (playing time) of the video reflected in the virtual channel may be varied depending on a type of the video reflected in the virtual channel. For example, if a still video is reflected in the virtual channel, the controller 180 may reflect the still video in the virtual channel, such that the still video may be output from the video output device 200 through the virtual channel for a predetermined time. For another example, if a moving video is reflected in the virtual channel, the controller 180 may reflect the moving video in the virtual channel, such that the moving video may be played for a time period corresponding to the playing time of the moving video. The predetermined time may be a time set by a user.

Also, the output time of the still video and the moving video may be varied under the control of the user.

Figure 12A:
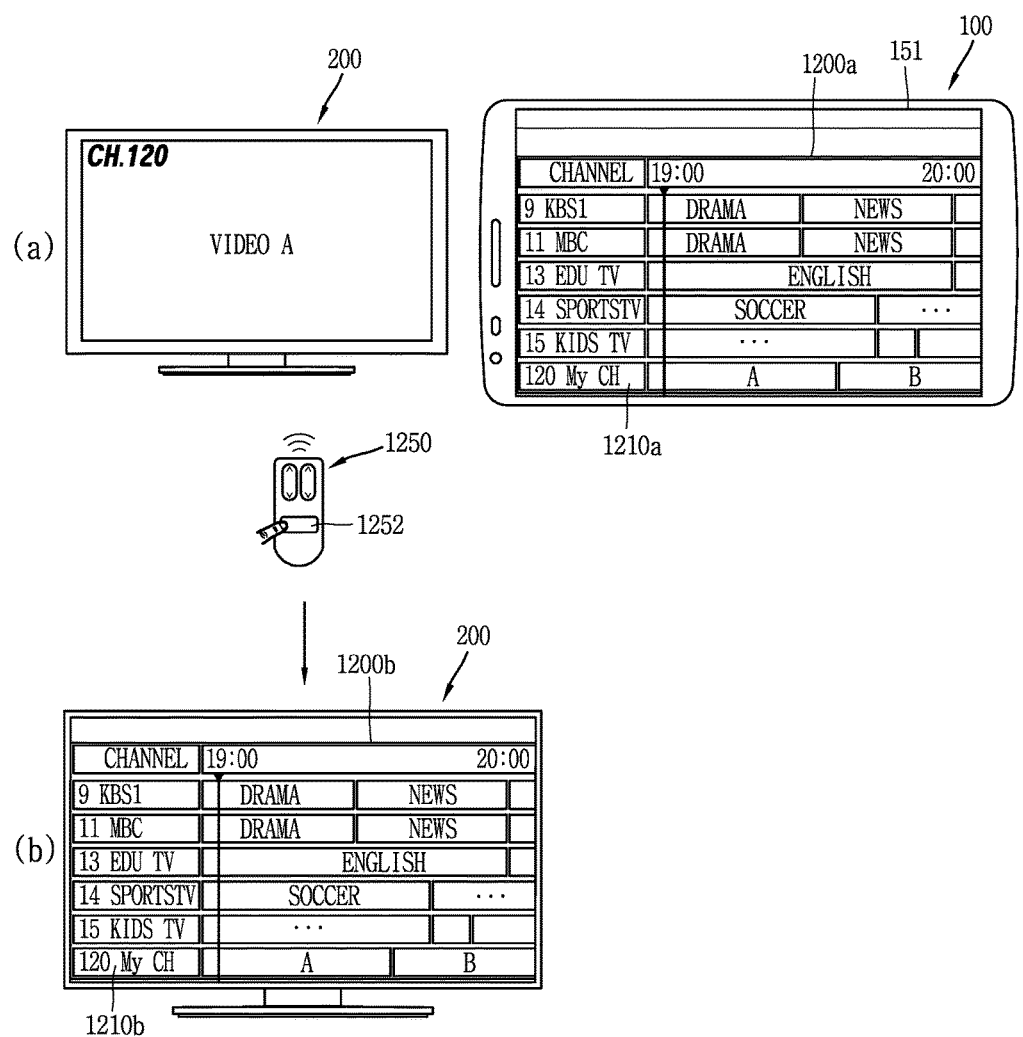
FIGS. 12a and 12b are conceptual views illustrating a method for outputting an EPG from an external input device to a video output device in a state that a virtual channel is generated.
Figure 12B:
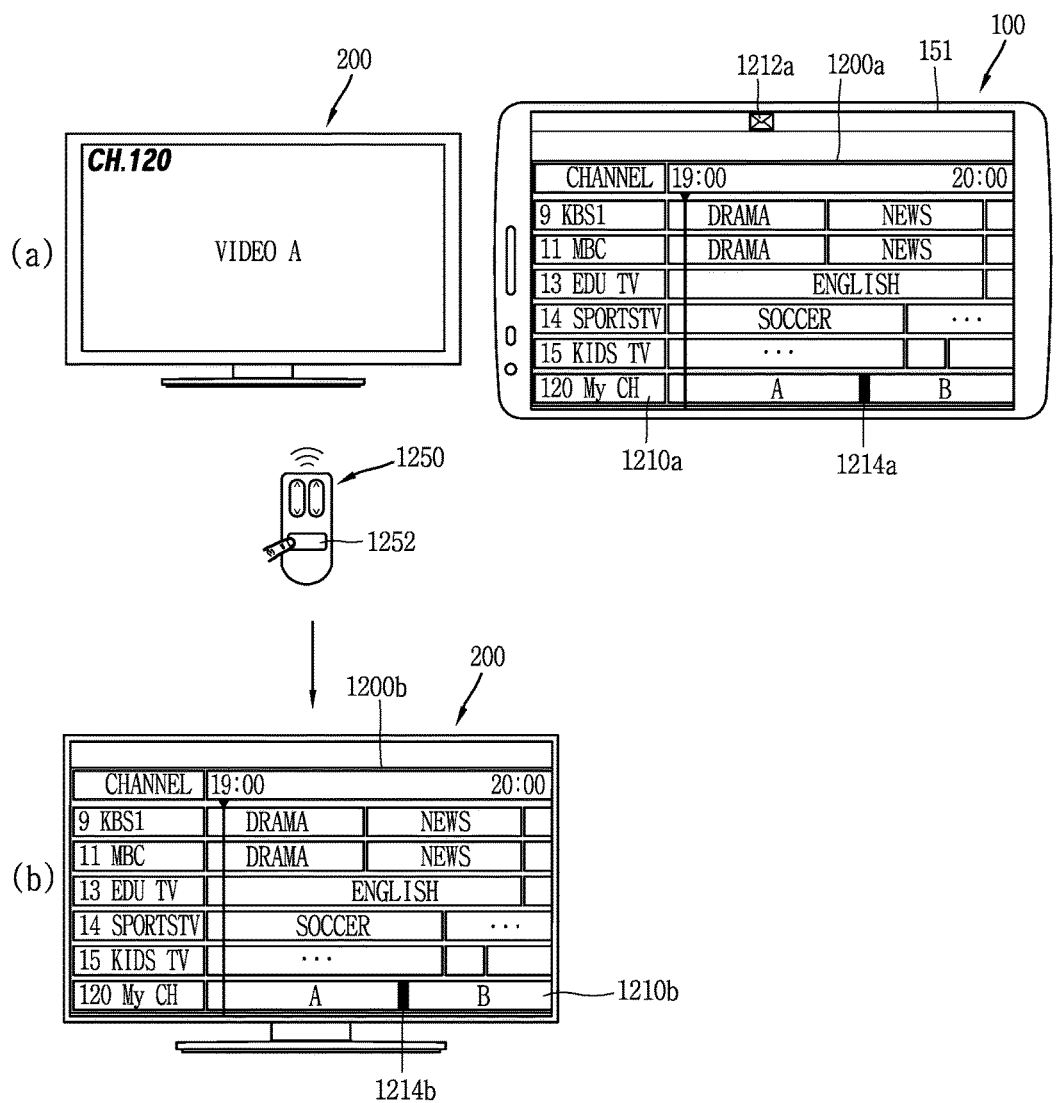

FIGS. 12a and 12b are conceptual views illustrating a method for outputting an EPG from an external input device to a video output device in a state that a virtual channel is generated.

As described above, the video output device 200 according to the present invention may be controlled by an external input device. The external input device, for example, may include a mobile terminal 100 and a remote controller.

As shown in (a) of FIG. 12a, a virtual channel may be generated between the mobile terminal 100 and the video output device 200. In this case, a video, which is reflected in the virtual channel and may be output from the mobile terminal 100, may be output to the display unit 251 of the video output device 200. As shown in FIG. 12a, an EPG 1200a may be output to the touch screen 151 of the mobile terminal 100. Channel information 1210a corresponding to the virtual channel may be displayed on the EPG 1200a.

In a state that the virtual channel is generated, as shown in (a) of FIG. 12a, if a button 1252 associated with an EPG output function provided in an external input device 1250 (for example, remote controller) is selected by a user, the controller 280 of the video output device 200 may output an EPG 1200b to the display unit 251 of the video output device 200. At this time, the EPG 1200b output to the display unit 251 of the video output device 200 may correspond to the EPG 1200a output to the touch screen 151 of the mobile terminal 100.

That is, channel information 1210b corresponding to the virtual channel may be displayed on the EPG 1200b output to the display unit 251 of the video output device 200.

In other words, in the present invention, if the virtual channel is generated by the mobile terminal 100, channel information corresponding to the virtual channel may be displayed on the EPG when the EPG is displayed on the video output device 200 by the input of the external input device 1250.

This may mean that the virtual channel is reflected in channels that may be output from the video output device 200.

If the button 1252 associated with the EPG output function of the external input device 1250 is selected in a state that the virtual channel is not generated, EPG, which does not include channel information corresponding to the virtual channel, may be output to the display unit 151 of the video output device 200.

Also, as shown in (a) of FIG. 12b, if an event occurs in a state that a video, which may be output from the mobile terminal, is being output from the video output device 200 through the virtual channel, the controller 180 may reflect information corresponding to the event in the virtual channel, such that the information corresponding to the event may be output from the video output device.

The event may include a push message of an application, a text message, a messenger, a phone, etc.

For example, as shown in (a) of FIG. 12b, if an event occurs in the mobile terminal 100, an icon 1212a indicating that the event has occurred may be displayed on the touch screen 51.

Also, the controller 180 may reflect the information corresponding to the event in the virtual channel, such that the information corresponding to the event may be output from the video output device 200. In this case, an indicator 1214a indicating that the information corresponding to the event has been reflected in the virtual channel may be displayed on channel information 1210a corresponding to the virtual channel of EPG 1200a displayed on the touch screen 151. For example, the information corresponding to the event may include event contents (push message content, text message content, messenger content, etc.).

In a state that the information corresponding to the event is reflected in the virtual channel, as shown in (a) of FIG. 12b, if the button 1252 associated with an EPG output function of the external input device 1250 is selected (pushed), the controller 280 of the video output device 200 may output the EPG 1200b to the display unit 251 of the video output device 200. At this time, the EPG 1200b output to the display unit 251 of the video output device 200 may correspond to the EPG 1200a output to the touch screen 151 of the mobile terminal 100.

That is, channel information 1210b corresponding to the virtual channel may be displayed on the EPG 1200b output to the display unit 251 of the video output device 200. Also, an indicator 1214ba indicating that the information corresponding to the event has been reflected in the virtual channel may be displayed on the channel information 1210b corresponding to the virtual channel.

In other words, in the present invention, if the event occurs in a state that the virtual channel is generated by the mobile terminal 100, event information (that is, information corresponding to the event or indicator indicating that the information corresponding to the event has been reflected in the virtual channel) may be displayed on the area of the EPG, on which channel information corresponding to the virtual channel is displayed, when the EPG is displayed on the video output device 200 by the input of the external input device 1250.

Through the aforementioned configuration, the present invention may provide a user interface that may display the EPG, in which the channel information corresponding to the virtual channel is reflected, on the video output device 200, if there is an EPG output request from an external input device (remote controller) in a state that the virtual channel related to the mobile terminal 100 and the video output device is generated.

As described above, according to the present invention, the optimized control method that may output the video, which may be output from the mobile terminal, from the video output device may be provided.

Also, in the present invention, the EPG may be output to the mobile terminal not the video output device, and the video output device may be controlled through the EPG displayed on the mobile terminal. Therefore, the user may be provided with the user interface that may control the video output device without any interruption in viewing the video output device.

Also, in the present invention, the virtual channel configured to output the plurality of videos, which may be output from the mobile terminal, from the video output device in accordance with the passage of time like one broadcast channel may be generated. Therefore, the present invention may provide the control method that may allow the user to continuously view the plurality of videos reflected in the virtual channel from the video output device without a separate manipulation in accordance with the passage of time like one broadcast channel by reflecting the plurality of videos in the virtual channel without outputting the videos one by one.

Also, the present invention may provide the optimized UI/UX (user interface/user experience) that may generate the virtual channel in a state that a folder, which includes videos, is displayed, and may reflect the videos included in the folder in the virtual channel.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication unit that performs a wireless communication with a video output device;
a touch screen that receives an input from a user; and
a controller electrically connected to the wireless communication unit and the touch screen, the controller controlling the touch screen to display a first folder in a first area of the touch screen and display an electronic program guide (EPG), which includes channel information related to the video output device, in a second area of the touch screen different from the first area,
wherein if a touch is applied to the first folder displayed in the first area, the controller generates a virtual channel to output a video included in the first folder to the video output device and changes the EPG to include information corresponding to the virtual channel,
wherein the controller is further configured to determine the number of virtual channel based on a type of touch applied to the first folder including a second folder,
if a first type of touch is applied to the first folder including the second folder, the controller generates a plurality of virtual channels including a first virtual channel and a second virtual channel, the video included in the first folder is only reflected in the first virtual channel and a video included in the second folder is reflected in the second virtual channel, and
if a second type of touch different from the first type touch is applied to the first folder including the second folder, the controller generates one virtual channel including the first virtual channel, both the video included in the first folder and the video included in the second folder are reflected in the first virtual channel, and
wherein the controller is further configured to determine whether to additionally generate the second virtual channel reflected the video included in the second folder or to reflect the video included in the second folder in the first virtual channel without generating the second virtual channel, based on a type of touch applied to the second folder included in the first folder.

2. The mobile terminal according to claim 1, further comprising a memory that stores the video included in the first folder displayed in the first area.

3. The mobile terminal according to claim 2, wherein the controller controls the touch screen to display a second folder different from the first folder in the first area of the touch screen, and wherein if the second folder is selected by the first type of touch, the controller generates the virtual channel in which a video included in the second folder is reflected.

4. The mobile terminal according to claim 3, wherein the first folder and the second folder, which belong to a higher folder, are displayed in the first area, and the controller generates the virtual channel in a different manner depending on a type of touch applied to the higher folder.

5. The mobile terminal according to claim 1, wherein if a lower folder exists in the first folder to which the first type of touch is applied, the controller generates a plurality of virtual channels including a first virtual channel in which the video included in the first folder is reflected and a second virtual channel in which a video included in the lower folder is reflected.

6. The mobile terminal according to claim 5, wherein the first type of touch is one of a short touch, a long touch, a tap touch, a multi-touch, a drag touch, a flick touch, a pinch-in touch, a pinch-out touch, a swipe touch and a hovering touch.

7. The mobile terminal according to claim 5, wherein the second virtual channel is set to a lower channel of the first virtual channel.

8. The mobile terminal according to claim 1, wherein if the first type of touch is applied to a higher folder of the first folder when the information corresponding to the virtual channel is reflected in the EPG, the controller generates a new virtual channel in which videos included in the higher folder are reflected, and changes the EPG to include information corresponding to the new virtual channel.

9. The mobile terminal according to claim 8, wherein a channel number of the virtual channel is changed based on the information corresponding to the new virtual channel.

10. The mobile terminal according to claim 9, wherein if the new virtual channel is generated when the channel number of the virtual channel is set to a first channel number, the controller sets a channel number of the new virtual channel to the first channel number and changes the channel number of the virtual channel from the first channel number to a second channel number different from the first channel number.

11. The mobile terminal according to claim 1, wherein thumbnails corresponding to videos in the first folder are displayed in the first area, and the controller generates the virtual channel on a basis of a user request and changes the EPG displayed on the second area so that the videos corresponding to the thumbnails are reflected in the virtual channel.

12. The mobile terminal according to claim 11, wherein the virtual channel is generated based on at least one of a type of touch applied to the thumbnails and a touch applied to a graphic object associated with a function of generating a virtual channel.

13. The mobile terminal according to claim 11, wherein the controller performs different operations depending on different types of touch applied to the thumbnails.

14. The mobile terminal according to claim 13, wherein the controller reflects the videos corresponding to the thumbnails in the generated virtual channel if the first type of touch is applied to the thumbnails, and selects the thumbnails if a second type of touch different from the first touch is applied to the thumbnails.

15. The mobile terminal according to claim 14, wherein if the first type of touch is applied when the thumbnails are selected, the controller reflects the videos corresponding to the thumbnails in the generated virtual channel.

16. The mobile terminal according to claim 15, wherein a play order of the videos reflected in the virtual channel is determined based on a selected order of the thumbnails.

17. The mobile terminal according to claim 1, wherein if an event occurs, the controller reflects information corresponding to the event in the virtual channel such that the information corresponding to the event is output from the video output device.

18. A method for controlling a mobile terminal, which performs a wireless communication with a video output device, the method comprising:
displaying a first folder in a first area of a touch screen and an electronic program guide (EPG), which includes channel information related to the video output device, in a second area of the touch screen different from the first area;
generating a virtual channel to output a video included in the first folder to the video output device, when a first touch is applied to the folder displayed in the first area; and
changing the EPG to include information corresponding to the virtual channel,
wherein further comprising determining the number of virtual channel based on a type of touch applied to the first folder including a second folder,
if a first type of touch is applied to the first folder including the second folder, generating a plurality of virtual channels including a first virtual channel and a second virtual channel, the video included in the first folder is only reflected in the first virtual channel and a video included in the second folder is reflected in the second virtual channel, and
if a second type of touch different from the first type touch is applied to the first folder including the second folder, the controller generates one virtual channel including the first virtual channel, both the video included in the first folder and the video included in the second folder are reflected in the first virtual channel, and
wherein further comprising determining whether to additionally generate the second virtual channel reflected the video included in the second folder or to reflect the video included in the second folder in the first virtual channel without generating the second virtual channel, based on a type of touch applied to the second folder included in the first folder.

19. The method according to claim 18 further comprising:
outputting the video included in the folder displayed in the first area and stored in a memory to the video output device depending on a passage of time set by a user.

* * * * *